(12) United States Patent
Das Sarma et al.

(10) Patent No.: US 11,561,791 B2
(45) Date of Patent: Jan. 24, 2023

(54) VECTOR COMPUTATIONAL UNIT RECEIVING DATA ELEMENTS IN PARALLEL FROM A LAST ROW OF A COMPUTATIONAL ARRAY

(71) Applicant: Tesla, Inc., Austin, TX (US)

(72) Inventors: Debjit Das Sarma, San Jose, CA (US); Emil Talpes, San Mateo, CA (US); Peter Joseph Bannon, Woodside, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 15/920,165

(22) Filed: Mar. 13, 2018

(65) Prior Publication Data

US 2019/0235866 A1    Aug. 1, 2019

Related U.S. Application Data

(60) Provisional application No. 62/625,249, filed on Feb. 1, 2018.

(51) Int. Cl.
*G06F 9/30* (2018.01)
*G06F 17/16* (2006.01)

(52) U.S. Cl.
CPC ........ *G06F 9/30036* (2013.01); *G06F 9/3001* (2013.01); *G06F 9/3013* (2013.01); *G06F 17/16* (2013.01)

(58) Field of Classification Search
CPC ............. G06F 9/30036; G06F 15/8053; G06F 15/8092; G06F 17/16; G06F 9/30043;
(Continued)

(56) References Cited

U.S. PATENT DOCUMENTS 5,239,636 A    8/1993   Fischer
5,267,185 A   11/1993   Akabane
(Continued)

FOREIGN PATENT DOCUMENTS

AU    2019261735 A1    6/2020
AU    2019201716 A1   10/2020
(Continued)

OTHER PUBLICATIONS

Definition of synchronize, Oxford Dictionary, retrieved Sep. 12, 2020, <https://www.lexico.com/en/definition/synchronize> (Year: 2020).*

(Continued)

*Primary Examiner* — David J. Huisman
*Assistant Examiner* — Kasim Alli
(74) *Attorney, Agent, or Firm* — Knobbe, Martens, Olson & Bear, LLP

(57) ABSTRACT

A microprocessor system comprises a vector computational unit and a control unit. The vector computational unit includes a plurality of processing elements. The control unit is configured to provide at least a single processor instruction to the vector computational unit. The single processor instruction specifies a plurality of component instructions to be executed by the vector computational unit in response to the single processor instruction and each of the plurality of processing elements of the vector computational unit is configured to process different data elements in parallel with other processing elements in response to the single processor instruction.

16 Claims, 12 Drawing Sheets

(58) Field of Classification Search
CPC .... G06F 9/3001; G06F 9/3013; G06F 9/3853; G06F 9/3867; G06F 9/3895
See application file for complete search history.

(56) References Cited

U.S. PATENT DOCUMENTS

| | | | |
|---|---|---|---|
| 5,311,459 | A | 5/1994 | D'Luna |
| 5,333,296 | A | 7/1994 | Bouchard |
| 5,471,627 | A | 11/1995 | Means |
| 5,519,864 | A | 5/1996 | Martell |
| 5,600,843 | A | 2/1997 | Kato |
| 5,717,947 | A | 2/1998 | Gallup et al. |
| 5,742,782 | A * | 4/1998 | Ito .................. G06F 9/3822 712/210 |
| 5,850,530 | A | 12/1998 | Chen |
| 5,887,183 | A | 3/1999 | Agarwal et al. |
| 6,122,722 | A * | 9/2000 | Slavenburg ......... G06F 9/30141 712/215 |
| 6,195,674 | B1 | 2/2001 | Elbourne |
| 6,446,190 | B1 * | 9/2002 | Barry ................. G06F 9/30043 711/214 |
| 6,882,755 | B2 | 4/2005 | Silverstein et al. |
| 7,209,031 | B2 | 4/2007 | Nakai et al. |
| 7,747,070 | B2 | 6/2010 | Puri |
| 7,904,867 | B2 | 3/2011 | Burch et al. |
| 7,974,492 | B2 | 7/2011 | Nishijima |
| 8,165,380 | B2 | 4/2012 | Choi et al. |
| 8,369,633 | B2 | 2/2013 | Lu et al. |
| 8,406,515 | B2 | 3/2013 | Cheatle et al. |
| 8,509,478 | B2 | 8/2013 | Haas et al. |
| 8,588,470 | B2 | 11/2013 | Rodriguez et al. |
| 8,744,174 | B2 | 6/2014 | Hamada et al. |
| 8,773,498 | B2 | 7/2014 | Lindbergh |
| 8,912,476 | B2 | 12/2014 | Fogg et al. |
| 8,913,830 | B2 | 12/2014 | Sun et al. |
| 8,924,455 | B1 | 12/2014 | Barman |
| 8,928,753 | B2 | 1/2015 | Han et al. |
| 8,972,095 | B2 | 3/2015 | Furuno et al. |
| 8,976,269 | B2 | 3/2015 | Duong |
| 9,008,422 | B2 | 4/2015 | Eid et al. |
| 9,081,385 | B1 | 7/2015 | Ferguson et al. |
| 9,275,289 | B2 | 3/2016 | Li et al. |
| 9,586,455 | B2 | 3/2017 | Sugai et al. |
| 9,672,437 | B2 | 6/2017 | McCarthy |
| 9,697,463 | B2 | 7/2017 | Ross |
| 9,710,696 | B2 | 7/2017 | Wang et al. |
| 9,738,223 | B2 | 8/2017 | Zhang et al. |
| 9,754,154 | B2 | 9/2017 | Craig et al. |
| 9,767,369 | B2 | 9/2017 | Furman et al. |
| 9,965,865 | B1 | 5/2018 | Agrawal et al. |
| 10,074,051 | B2 | 9/2018 | Thorson |
| 10,133,273 | B2 | 11/2018 | Linke |
| 10,140,252 | B2 | 11/2018 | Powers et al. |
| 10,140,544 | B1 | 11/2018 | Zhao et al. |
| 10,146,225 | B2 | 12/2018 | Ryan |
| 10,152,655 | B2 | 12/2018 | Krishnamurthy et al. |
| 10,167,800 | B1 | 1/2019 | Chung et al. |
| 10,169,680 | B1 | 1/2019 | Sachdeva et al. |
| 10,192,016 | B2 | 1/2019 | Ng et al. |
| 10,216,189 | B1 | 2/2019 | Haynes |
| 10,228,693 | B2 | 3/2019 | Micks et al. |
| 10,242,293 | B2 | 3/2019 | Shim et al. |
| 10,248,121 | B2 | 4/2019 | Vandenberg, III |
| 10,262,218 | B2 | 4/2019 | Lee et al. |
| 10,282,623 | B1 | 5/2019 | Ziyaee et al. |
| 10,296,828 | B2 | 5/2019 | Viswanathan |
| 10,303,961 | B1 | 5/2019 | Stoffel et al. |
| 10,310,087 | B2 | 6/2019 | Laddha et al. |
| 10,311,312 | B2 | 6/2019 | Yu et al. |
| 10,318,848 | B2 | 6/2019 | Dijkman et al. |
| 10,325,178 | B1 | 6/2019 | Tang et al. |
| 10,331,974 | B2 | 6/2019 | Zia et al. |
| 10,338,600 | B2 | 7/2019 | Yoon et al. |
| 10,343,607 | B2 | 7/2019 | Kumon et al. |
| 10,359,783 | B2 | 7/2019 | Williams et al. |
| 10,366,290 | B2 | 7/2019 | Wang et al. |
| 10,372,130 | B1 | 8/2019 | Kaushansky et al. |
| 10,373,019 | B2 | 8/2019 | Nariyambut Murali et al. |
| 10,373,026 | B1 | 8/2019 | Kim et al. |
| 10,380,741 | B2 | 8/2019 | Yedla et al. |
| 10,394,237 | B2 | 8/2019 | Xu et al. |
| 10,395,144 | B2 | 8/2019 | Zeng et al. |
| 10,402,646 | B2 | 9/2019 | Klaus |
| 10,402,986 | B2 | 9/2019 | Ray et al. |
| 10,414,395 | B1 | 9/2019 | Sapp et al. |
| 10,423,934 | B1 | 9/2019 | Zanghi et al. |
| 10,436,615 | B2 | 10/2019 | Agarwal et al. |
| 10,452,905 | B2 | 10/2019 | Segalovitz et al. |
| 10,460,053 | B2 | 10/2019 | Olson et al. |
| 10,467,459 | B2 | 11/2019 | Chen et al. |
| 10,468,008 | B2 | 11/2019 | Beckman et al. |
| 10,468,062 | B1 | 11/2019 | Levinson et al. |
| 10,470,510 | B1 | 11/2019 | Koh et al. |
| 10,474,160 | B2 | 11/2019 | Huang et al. |
| 10,474,161 | B2 | 11/2019 | Huang et al. |
| 10,474,928 | B2 | 11/2019 | Sivakumar et al. |
| 10,489,126 | B2 | 11/2019 | Kumar et al. |
| 10,489,478 | B2 | 11/2019 | Shalev |
| 10,489,972 | B2 | 11/2019 | Atsmon |
| 10,503,971 | B1 | 12/2019 | Dang et al. |
| 10,514,711 | B2 | 12/2019 | Bar-Nahum et al. |
| 10,528,824 | B2 | 1/2020 | Zou |
| 10,529,078 | B2 | 1/2020 | Abreu et al. |
| 10,529,088 | B2 | 1/2020 | Fine et al. |
| 10,534,854 | B2 | 1/2020 | Sharma et al. |
| 10,535,191 | B2 | 1/2020 | Sachdeva et al. |
| 10,542,930 | B1 | 1/2020 | Sanchez et al. |
| 10,546,197 | B2 | 1/2020 | Shrestha et al. |
| 10,546,217 | B2 | 1/2020 | Albright et al. |
| 10,552,682 | B2 | 2/2020 | Jonsson et al. |
| 10,559,386 | B1 | 2/2020 | Neuman |
| 10,565,475 | B2 | 2/2020 | Lecue et al. |
| 10,567,674 | B2 | 2/2020 | Kirsch |
| 10,568,570 | B1 | 2/2020 | Sherpa et al. |
| 10,572,717 | B1 | 2/2020 | Zhu et al. |
| 10,574,905 | B2 | 2/2020 | Srikanth et al. |
| 10,579,058 | B2 | 3/2020 | Oh et al. |
| 10,579,063 | B2 | 3/2020 | Haynes et al. |
| 10,579,897 | B2 | 3/2020 | Redmon et al. |
| 10,586,280 | B2 | 3/2020 | McKenna et al. |
| 10,591,914 | B2 | 3/2020 | Palanisamy et al. |
| 10,592,785 | B2 | 3/2020 | Zhu et al. |
| 10,599,701 | B2 | 3/2020 | Liu |
| 10,599,930 | B2 | 3/2020 | Lee et al. |
| 10,599,958 | B2 | 3/2020 | He et al. |
| 10,606,990 | B2 | 3/2020 | Tull et al. |
| 10,609,434 | B2 | 3/2020 | Singhai et al. |
| 10,614,344 | B2 | 4/2020 | Anthony et al. |
| 10,621,513 | B2 | 4/2020 | Deshpande et al. |
| 10,627,818 | B2 | 4/2020 | Sapp et al. |
| 10,628,432 | B2 | 4/2020 | Guo et al. |
| 10,628,686 | B2 | 4/2020 | Ogale et al. |
| 10,628,688 | B1 | 4/2020 | Kim et al. |
| 10,629,080 | B2 | 4/2020 | Kazemi et al. |
| 10,636,161 | B2 | 4/2020 | Uchigaito |
| 10,636,169 | B2 | 4/2020 | Estrada et al. |
| 10,642,275 | B2 | 5/2020 | Silva et al. |
| 10,645,344 | B2 | 5/2020 | Marman et al. |
| 10,649,464 | B2 | 5/2020 | Gray |
| 10,650,071 | B2 | 5/2020 | Asgekar et al. |
| 10,652,565 | B1 | 5/2020 | Zhang et al. |
| 10,656,657 | B2 | 5/2020 | Djuric et al. |
| 10,657,391 | B2 | 5/2020 | Chen et al. |
| 10,657,418 | B2 | 5/2020 | Marder et al. |
| 10,657,934 | B1 | 5/2020 | Kolen et al. |
| 10,661,902 | B1 | 5/2020 | Tavshikar |
| 10,664,750 | B2 | 5/2020 | Greene |
| 10,671,082 | B2 | 6/2020 | Huang et al. |
| 10,671,349 | B2 | 6/2020 | Bannon et al. |
| 10,671,886 | B2 | 6/2020 | Price et al. |
| 10,678,244 | B2 | 6/2020 | Iandola et al. |
| 10,678,839 | B2 | 6/2020 | Gordon et al. |
| 10,678,997 | B2 | 6/2020 | Ahuja et al. |
| 10,679,129 | B2 | 6/2020 | Baker |

(56) References Cited

U.S. PATENT DOCUMENTS

| | | |
|---|---|---|
| 10,685,159 B2 | 6/2020 | Su et al. |
| 10,685,188 B1 | 6/2020 | Zhang et al. |
| 10,692,000 B2 | 6/2020 | Surazhsky et al. |
| 10,692,242 B1 | 6/2020 | Morrison et al. |
| 10,693,740 B2 | 6/2020 | Coccia et al. |
| 10,698,868 B2 | 6/2020 | Guggilla et al. |
| 10,699,119 B2 | 6/2020 | Lo et al. |
| 10,699,140 B2 | 6/2020 | Kench et al. |
| 10,699,477 B2 | 6/2020 | Levinson et al. |
| 10,713,502 B2 | 7/2020 | Tiziani |
| 10,719,759 B2 | 7/2020 | Kutliroff |
| 10,725,475 B2 | 7/2020 | Yang et al. |
| 10,726,264 B2 | 7/2020 | Sawhney et al. |
| 10,726,279 B1 | 7/2020 | Kim et al. |
| 10,726,374 B1 | 7/2020 | Engineer et al. |
| 10,732,261 B1 | 8/2020 | Wang et al. |
| 10,733,262 B2 | 8/2020 | Miller et al. |
| 10,733,482 B1 | 8/2020 | Lee et al. |
| 10,733,638 B1 | 8/2020 | Jain et al. |
| 10,733,755 B2 | 8/2020 | Liao et al. |
| 10,733,876 B2 | 8/2020 | Moura et al. |
| 10,740,563 B2 | 8/2020 | Dugan |
| 10,740,914 B2 | 8/2020 | Xiao et al. |
| 10,748,062 B2 | 8/2020 | Rippel et al. |
| 10,748,247 B2 | 8/2020 | Paluri |
| 10,751,879 B2 | 8/2020 | Li et al. |
| 10,755,112 B2 | 8/2020 | Mabuchi |
| 10,755,575 B2 | 8/2020 | Johnston et al. |
| 10,757,330 B2 | 8/2020 | Ashrafi |
| 10,762,396 B2 | 9/2020 | Vallespi et al. |
| 10,768,628 B2 | 9/2020 | Martin et al. |
| 10,768,629 B2 | 9/2020 | Song et al. |
| 10,769,446 B2 | 9/2020 | Chang et al. |
| 10,769,483 B2 | 9/2020 | Nirenberg et al. |
| 10,769,493 B2 | 9/2020 | Yu et al. |
| 10,769,494 B2 | 9/2020 | Xiao et al. |
| 10,769,525 B2 | 9/2020 | Redding et al. |
| 10,776,626 B1 | 9/2020 | Lin et al. |
| 10,776,673 B2 | 9/2020 | Kim et al. |
| 10,776,939 B2 | 9/2020 | Ma et al. |
| 10,779,760 B2 | 9/2020 | Lee et al. |
| 10,783,381 B2 | 9/2020 | Yu et al. |
| 10,783,454 B2 | 9/2020 | Shoaib et al. |
| 10,789,402 B1 | 9/2020 | Vemuri et al. |
| 10,789,544 B2 | 9/2020 | Fiedel et al. |
| 10,790,919 B1 | 9/2020 | Kolen et al. |
| 10,796,221 B2 | 10/2020 | Zhang et al. |
| 10,796,355 B1 | 10/2020 | Price et al. |
| 10,796,423 B2 | 10/2020 | Goja |
| 10,798,368 B2 | 10/2020 | Briggs et al. |
| 10,803,325 B2 | 10/2020 | Bai et al. |
| 10,803,328 B1 | 10/2020 | Bai et al. |
| 10,803,743 B2 | 10/2020 | Abari et al. |
| 10,805,629 B2 | 10/2020 | Liu et al. |
| 10,809,730 B2 | 10/2020 | Chintakindi |
| 10,810,445 B1 | 10/2020 | Kangaspunta |
| 10,816,346 B2 | 10/2020 | Wheeler et al. |
| 10,816,992 B2 | 10/2020 | Chen |
| 10,817,731 B2 | 10/2020 | Vallespi et al. |
| 10,817,732 B2 | 10/2020 | Porter et al. |
| 10,819,923 B1 | 10/2020 | McCauley et al. |
| 10,824,122 B2 | 11/2020 | Mummadi et al. |
| 10,824,862 B2 | 11/2020 | Qi et al. |
| 10,828,790 B2 | 11/2020 | Nemallan |
| 10,832,057 B2 | 11/2020 | Chan et al. |
| 10,832,093 B1 | 11/2020 | Taralova et al. |
| 10,832,414 B2 | 11/2020 | Pfeiffer |
| 10,832,418 B1 | 11/2020 | Karasev et al. |
| 10,833,785 B1 | 11/2020 | O'Shea et al. |
| 10,836,379 B2 | 11/2020 | Xiao et al. |
| 10,838,936 B2 | 11/2020 | Cohen |
| 10,839,230 B2 | 11/2020 | Charette et al. |
| 10,839,578 B2 | 11/2020 | Coppersmith et al. |
| 10,843,628 B2 | 11/2020 | Kawamoto et al. |
| 10,845,820 B2 | 11/2020 | Wheeler |
| 10,845,943 B1 | 11/2020 | Ansari et al. |
| 10,846,831 B2 | 11/2020 | Raduta |
| 10,846,888 B2 | 11/2020 | Kaplanyan et al. |
| 10,853,670 B2 | 12/2020 | Sholingar et al. |
| 10,853,739 B2 | 12/2020 | Truong et al. |
| 10,860,919 B2 | 12/2020 | Kanazawa et al. |
| 10,860,924 B2 | 12/2020 | Burger |
| 10,867,444 B2 | 12/2020 | Russell et al. |
| 10,871,444 B2 | 12/2020 | Al et al. |
| 10,871,782 B2 | 12/2020 | Milstein et al. |
| 10,872,204 B2 | 12/2020 | Zhu et al. |
| 10,872,254 B2 | 12/2020 | Mangla et al. |
| 10,872,326 B2 | 12/2020 | Garner |
| 10,872,531 B2 | 12/2020 | Liu et al. |
| 10,885,083 B2 | 1/2021 | Moeller-Bertram et al. |
| 10,887,433 B2 | 1/2021 | Fu et al. |
| 10,890,898 B2 | 1/2021 | Akella et al. |
| 10,891,715 B2 | 1/2021 | Li |
| 10,891,735 B2 | 1/2021 | Yang et al. |
| 10,893,070 B2 | 1/2021 | Wang et al. |
| 10,893,107 B1 | 1/2021 | Callari et al. |
| 10,896,763 B2 | 1/2021 | Kempanna et al. |
| 10,901,416 B2 | 1/2021 | Khanna et al. |
| 10,901,508 B2 | 1/2021 | Laszlo et al. |
| 10,902,551 B1 | 1/2021 | Mellado et al. |
| 10,908,068 B2 | 2/2021 | Amer et al. |
| 10,908,606 B2 | 2/2021 | Stein et al. |
| 10,909,368 B2 | 2/2021 | Guo et al. |
| 10,909,453 B1 | 2/2021 | Myers et al. |
| 10,915,783 B1 | 2/2021 | Hallman et al. |
| 10,917,522 B2 | 2/2021 | Segalis et al. |
| 10,921,817 B1 | 2/2021 | Kangaspunta |
| 10,922,578 B2 | 2/2021 | Banerjee et al. |
| 10,924,661 B2 | 2/2021 | Vasconcelos et al. |
| 10,928,508 B2 | 2/2021 | Swaminathan |
| 10,929,757 B2 | 2/2021 | Baker et al. |
| 10,930,065 B2 | 2/2021 | Grant et al. |
| 10,936,908 B1 | 3/2021 | Ho et al. |
| 10,937,186 B2 | 3/2021 | Wang et al. |
| 10,942,737 B2 * | 3/2021 | Ivanov .................. G06F 9/3877 |
| 10,943,101 B2 | 3/2021 | Agarwal et al. |
| 10,943,132 B2 | 3/2021 | Wang et al. |
| 10,943,355 B2 | 3/2021 | Fagg et al. |
| 11,210,584 B1 | 12/2021 | Brand |
| 11,403,069 B2 | 8/2022 | Bannon et al. |
| 2002/0169942 A1 * | 11/2002 | Sugimoto .............. G06F 9/3895 |
| | | 712/24 |
| 2003/0035481 A1 | 2/2003 | Hahm |
| 2005/0125369 A1 | 6/2005 | Buck |
| 2005/0162445 A1 | 7/2005 | Sheasby et al. |
| 2006/0072847 A1 | 4/2006 | Chor et al. |
| 2006/0224533 A1 | 10/2006 | Thaler |
| 2006/0280364 A1 | 12/2006 | Ma et al. |
| 2007/0255903 A1 | 11/2007 | Tsadik |
| 2009/0016571 A1 | 1/2009 | Tijerina et al. |
| 2009/0192958 A1 | 7/2009 | Todorokihara |
| 2010/0017351 A1 | 1/2010 | Hench |
| 2010/0118157 A1 | 5/2010 | Kameyama |
| 2011/0029471 A1 | 2/2011 | Chakradhar |
| 2011/0239032 A1 | 9/2011 | Kato et al. |
| 2012/0017066 A1 | 1/2012 | Vorbach et al. |
| 2012/0109915 A1 | 5/2012 | Kamekawa |
| 2012/0110491 A1 | 5/2012 | Cheung |
| 2012/0134595 A1 | 5/2012 | Fonseca et al. |
| 2012/0323832 A1 | 12/2012 | Snook |
| 2013/0159665 A1 | 6/2013 | Kashyap |
| 2014/0046995 A1 | 2/2014 | Fanous |
| 2014/0089232 A1 | 3/2014 | Buibas |
| 2014/0142929 A1 | 5/2014 | Seide |
| 2014/0180989 A1 | 6/2014 | Krizhevsky |
| 2014/0277718 A1 | 9/2014 | Izhikevich |
| 2014/0351190 A1 | 11/2014 | Levin |
| 2015/0046332 A1 | 2/2015 | Adjaoute |
| 2015/0104102 A1 | 4/2015 | Carreira et al. |
| 2015/0199272 A1 | 7/2015 | Goel |
| 2015/0331832 A1 | 11/2015 | Minoya |
| 2016/0085721 A1 | 3/2016 | Abali |
| 2016/0132786 A1 | 5/2016 | Balan et al. |
| 2016/0328856 A1 | 11/2016 | Mannino et al. |

(56) References Cited

U.S. PATENT DOCUMENTS

| | | |
|---|---|---|
| 2016/0342889 A1 | 11/2016 | Thorson |
| 2016/0342890 A1 | 11/2016 | Young |
| 2016/0342891 A1 | 11/2016 | Ross |
| 2016/0342892 A1 | 11/2016 | Ross |
| 2016/0342893 A1 | 11/2016 | Ross |
| 2016/0364334 A1 | 12/2016 | Asaro |
| 2016/0379109 A1 | 12/2016 | Chung |
| 2017/0011281 A1 | 1/2017 | Dihkman et al. |
| 2017/0052785 A1 | 2/2017 | Uliel |
| 2017/0060811 A1 | 3/2017 | Yang |
| 2017/0097884 A1 | 4/2017 | Werner |
| 2017/0103298 A1 | 4/2017 | Ling |
| 2017/0103299 A1 | 4/2017 | Aydonat |
| 2017/0103313 A1 | 4/2017 | Ross et al. |
| 2017/0103318 A1 | 4/2017 | Ross |
| 2017/0158134 A1 | 6/2017 | Shigemura |
| 2017/0193360 A1 | 7/2017 | Gao |
| 2017/0206434 A1 | 7/2017 | Nariyambut et al. |
| 2017/0277537 A1 | 9/2017 | Grocutt |
| 2017/0277658 A1 | 9/2017 | Pratas |
| 2018/0012411 A1 | 1/2018 | Richey et al. |
| 2018/0018590 A1 | 1/2018 | Szeto et al. |
| 2018/0032857 A1 | 2/2018 | Lele |
| 2018/0039853 A1 | 2/2018 | Liu et al. |
| 2018/0046900 A1 | 2/2018 | Dally |
| 2018/0067489 A1 | 3/2018 | Oder et al. |
| 2018/0068459 A1 | 3/2018 | Zhang et al. |
| 2018/0068540 A1 | 3/2018 | Romanenko et al. |
| 2018/0074506 A1 | 3/2018 | Branson |
| 2018/0107484 A1 | 4/2018 | Sebexen |
| 2018/0121762 A1 | 5/2018 | Han et al. |
| 2018/0150081 A1 | 5/2018 | Gross et al. |
| 2018/0157961 A1 | 6/2018 | Henry |
| 2018/0157962 A1 | 6/2018 | Henry |
| 2018/0157966 A1 | 6/2018 | Henry |
| 2018/0189633 A1 | 7/2018 | Henry |
| 2018/0189639 A1 | 7/2018 | Henry |
| 2018/0189640 A1 | 7/2018 | Henry |
| 2018/0189649 A1 | 7/2018 | Naranyan |
| 2018/0189651 A1 | 7/2018 | Henry |
| 2018/0197067 A1 | 7/2018 | Mody |
| 2018/0211403 A1 | 7/2018 | Hotson et al. |
| 2018/0218260 A1 | 8/2018 | Brand |
| 2018/0247180 A1 | 8/2018 | Cheng |
| 2018/0260220 A1* | 9/2018 | Lacy .................... G06F 9/3001 |
| 2018/0307438 A1 | 10/2018 | Huang |
| 2018/0307783 A1 | 10/2018 | Hah |
| 2018/0308012 A1 | 10/2018 | Mummadi et al. |
| 2018/0314878 A1 | 11/2018 | Lee et al. |
| 2018/0315153 A1 | 11/2018 | Park |
| 2018/0336164 A1* | 11/2018 | Phelps ................ G06F 9/30032 |
| 2018/0357511 A1 | 12/2018 | Misra et al. |
| 2018/0374105 A1 | 12/2018 | Azout et al. |
| 2019/0011551 A1 | 1/2019 | Yamamoto |
| 2019/0023277 A1 | 1/2019 | Roger et al. |
| 2019/0025773 A1 | 1/2019 | Yang et al. |
| 2019/0026237 A1 | 1/2019 | Talpes |
| 2019/0026249 A1 | 1/2019 | Talpes |
| 2019/0026250 A1 | 1/2019 | Das Sarma |
| 2019/0042894 A1 | 2/2019 | Anderson |
| 2019/0042919 A1 | 2/2019 | Peysakhovich et al. |
| 2019/0042944 A1 | 2/2019 | Nair et al. |
| 2019/0042948 A1 | 2/2019 | Lee et al. |
| 2019/0057314 A1 | 2/2019 | Julian et al. |
| 2019/0065637 A1 | 2/2019 | Bogdoll et al. |
| 2019/0072978 A1 | 3/2019 | Levi |
| 2019/0079526 A1 | 3/2019 | Vallespi et al. |
| 2019/0080602 A1 | 3/2019 | Rice et al. |
| 2019/0088948 A1 | 3/2019 | Rasale |
| 2019/0095780 A1 | 3/2019 | Zhong et al. |
| 2019/0095946 A1 | 3/2019 | Azout et al. |
| 2019/0101914 A1 | 4/2019 | Coleman et al. |
| 2019/0108417 A1 | 4/2019 | Talagala et al. |
| 2019/0122111 A1 | 4/2019 | Min et al. |
| 2019/0130255 A1 | 5/2019 | Yim et al. |
| 2019/0145765 A1 | 5/2019 | Luo et al. |
| 2019/0146497 A1 | 5/2019 | Urtasun et al. |
| 2019/0147112 A1 | 5/2019 | Gordon |
| 2019/0147250 A1 | 5/2019 | Zhang et al. |
| 2019/0147254 A1 | 5/2019 | Bai et al. |
| 2019/0147255 A1 | 5/2019 | Homayounfar et al. |
| 2019/0147335 A1 | 5/2019 | Wang et al. |
| 2019/0147372 A1 | 5/2019 | Luo et al. |
| 2019/0158784 A1 | 5/2019 | Ahn et al. |
| 2019/0179870 A1 | 6/2019 | Bannon |
| 2019/0180154 A1 | 6/2019 | Orlov et al. |
| 2019/0185010 A1 | 6/2019 | Ganguli et al. |
| 2019/0189251 A1 | 6/2019 | Horiuchi et al. |
| 2019/0197357 A1 | 6/2019 | Anderson et al. |
| 2019/0204842 A1 | 7/2019 | Jafari et al. |
| 2019/0205402 A1 | 7/2019 | Sernau et al. |
| 2019/0205667 A1 | 7/2019 | Avidan et al. |
| 2019/0217791 A1 | 7/2019 | Bradley et al. |
| 2019/0227562 A1 | 7/2019 | Mohammadiha et al. |
| 2019/0228037 A1 | 7/2019 | Nicol et al. |
| 2019/0230282 A1 | 7/2019 | Sypitkowski et al. |
| 2019/0235499 A1 | 8/2019 | Kazemi et al. |
| 2019/0235866 A1 | 8/2019 | Das Sarma |
| 2019/0236437 A1 | 8/2019 | Shin et al. |
| 2019/0243371 A1 | 8/2019 | Nister et al. |
| 2019/0244138 A1 | 8/2019 | Bhowmick et al. |
| 2019/0250622 A1 | 8/2019 | Nister et al. |
| 2019/0250626 A1 | 8/2019 | Ghafarianzadeh et al. |
| 2019/0250640 A1 | 8/2019 | O'Flaherty et al. |
| 2019/0258878 A1 | 8/2019 | Koivisto et al. |
| 2019/0266418 A1 | 8/2019 | Xu et al. |
| 2019/0266610 A1 | 8/2019 | Ghatage et al. |
| 2019/0272446 A1 | 9/2019 | Kangaspunta et al. |
| 2019/0276041 A1 | 9/2019 | Choi et al. |
| 2019/0279004 A1 | 9/2019 | Kwon et al. |
| 2019/0286652 A1 | 9/2019 | Habbecke et al. |
| 2019/0286972 A1 | 9/2019 | El Husseini et al. |
| 2019/0287028 A1 | 9/2019 | St Amant et al. |
| 2019/0289281 A1 | 9/2019 | Badrinarayanan et al. |
| 2019/0294177 A1 | 9/2019 | Kwon et al. |
| 2019/0294975 A1 | 9/2019 | Sachs |
| 2019/0311253 A1 | 10/2019 | Chung |
| 2019/0311290 A1 | 10/2019 | Huang et al. |
| 2019/0318099 A1 | 10/2019 | Carvalho et al. |
| 2019/0325088 A1 | 10/2019 | Dubey et al. |
| 2019/0325266 A1 | 10/2019 | Klepper et al. |
| 2019/0325269 A1 | 10/2019 | Bagherinezhad et al. |
| 2019/0325580 A1 | 10/2019 | Lukac et al. |
| 2019/0325595 A1 | 10/2019 | Stein et al. |
| 2019/0329790 A1 | 10/2019 | Nandakumar et al. |
| 2019/0332875 A1 | 10/2019 | Vallespi-Gonzalez et al. |
| 2019/0333232 A1 | 10/2019 | Vallespi-Gonzalez et al. |
| 2019/0336063 A1 | 11/2019 | Dascalu |
| 2019/0339989 A1 | 11/2019 | Liang et al. |
| 2019/0340462 A1 | 11/2019 | Pao et al. |
| 2019/0340492 A1 | 11/2019 | Burger et al. |
| 2019/0340499 A1 | 11/2019 | Burger et al. |
| 2019/0347501 A1 | 11/2019 | Kim et al. |
| 2019/0349571 A1 | 11/2019 | Herman et al. |
| 2019/0354782 A1 | 11/2019 | Kee et al. |
| 2019/0354786 A1 | 11/2019 | Lee et al. |
| 2019/0354808 A1 | 11/2019 | Park et al. |
| 2019/0354817 A1 | 11/2019 | Shlens et al. |
| 2019/0354850 A1 | 11/2019 | Watson et al. |
| 2019/0370398 A1 | 12/2019 | He et al. |
| 2019/0370575 A1 | 12/2019 | Nandakumar et al. |
| 2019/0370645 A1 | 12/2019 | Lee |
| 2019/0370935 A1 | 12/2019 | Chang et al. |
| 2019/0373322 A1 | 12/2019 | Rojas-Echenique et al. |
| 2019/0377345 A1 | 12/2019 | Bachrach et al. |
| 2019/0377965 A1 | 12/2019 | Totolos et al. |
| 2019/0378049 A1 | 12/2019 | Widmann et al. |
| 2019/0378051 A1 | 12/2019 | Widmann et al. |
| 2019/0382007 A1 | 12/2019 | Casas et al. |
| 2019/0384303 A1 | 12/2019 | Muller et al. |
| 2019/0384304 A1 | 12/2019 | Towal et al. |
| 2019/0384309 A1 | 12/2019 | Silva et al. |
| 2019/0384994 A1 | 12/2019 | Frossard et al. |
| 2019/0385048 A1 | 12/2019 | Cassidy et al. |

(56) References Cited

U.S. PATENT DOCUMENTS

| | | |
|---|---|---|
| 2019/0385360 A1 | 12/2019 | Yang et al. |
| 2020/0004259 A1 | 1/2020 | Gulino et al. |
| 2020/0004351 A1 | 1/2020 | Marchant et al. |
| 2020/0012936 A1 | 1/2020 | Lee et al. |
| 2020/0017117 A1 | 1/2020 | Milton |
| 2020/0025931 A1 | 1/2020 | Liang et al. |
| 2020/0026282 A1 | 1/2020 | Choe et al. |
| 2020/0026283 A1 | 1/2020 | Barnes et al. |
| 2020/0026992 A1 | 1/2020 | Zhang et al. |
| 2020/0027210 A1 | 1/2020 | Haemel et al. |
| 2020/0033858 A1 | 1/2020 | Xiao |
| 2020/0033865 A1 | 1/2020 | Mellinger et al. |
| 2020/0034148 A1 | 1/2020 | Sumbu |
| 2020/0034665 A1 | 1/2020 | Ghanta et al. |
| 2020/0034710 A1 | 1/2020 | Sidhu et al. |
| 2020/0036948 A1 | 1/2020 | Song |
| 2020/0039520 A1 | 2/2020 | Misu et al. |
| 2020/0051550 A1 | 2/2020 | Baker |
| 2020/0060757 A1 | 2/2020 | Ben-Haim et al. |
| 2020/0065711 A1 | 2/2020 | Clément et al. |
| 2020/0065879 A1 | 2/2020 | Hu et al. |
| 2020/0069973 A1 | 3/2020 | Lou et al. |
| 2020/0073385 A1 | 3/2020 | Jobanputra et al. |
| 2020/0074230 A1 | 3/2020 | Englard et al. |
| 2020/0086880 A1 | 3/2020 | Poeppel et al. |
| 2020/0089243 A1 | 3/2020 | Poeppel et al. |
| 2020/0089969 A1 | 3/2020 | Lakshmi et al. |
| 2020/0090056 A1 | 3/2020 | Singhal et al. |
| 2020/0097841 A1 | 3/2020 | Petousis et al. |
| 2020/0098095 A1 | 3/2020 | Borcs et al. |
| 2020/0103894 A1 | 4/2020 | Cella et al. |
| 2020/0104705 A1 | 4/2020 | Bhowmick et al. |
| 2020/0110416 A1 | 4/2020 | Hong et al. |
| 2020/0117180 A1 | 4/2020 | Cella et al. |
| 2020/0117889 A1 | 4/2020 | Laput et al. |
| 2020/0117916 A1 | 4/2020 | Liu |
| 2020/0117917 A1 | 4/2020 | Yoo |
| 2020/0118035 A1 | 4/2020 | Asawa et al. |
| 2020/0125844 A1 | 4/2020 | She et al. |
| 2020/0125845 A1 | 4/2020 | Hess et al. |
| 2020/0126129 A1 | 4/2020 | Lkhamsuren et al. |
| 2020/0134427 A1 | 4/2020 | Oh et al. |
| 2020/0134461 A1 | 4/2020 | Chai et al. |
| 2020/0134466 A1 | 4/2020 | Weintraub et al. |
| 2020/0134848 A1 | 4/2020 | El-Khamy et al. |
| 2020/0143231 A1 | 5/2020 | Fusi et al. |
| 2020/0143279 A1 | 5/2020 | West et al. |
| 2020/0148201 A1 | 5/2020 | King et al. |
| 2020/0149898 A1 | 5/2020 | Felip et al. |
| 2020/0151201 A1 | 5/2020 | Chandrasekhar et al. |
| 2020/0151619 A1 | 5/2020 | Mopur et al. |
| 2020/0151692 A1 | 5/2020 | Gao et al. |
| 2020/0158822 A1 | 5/2020 | Owens et al. |
| 2020/0158869 A1 | 5/2020 | Amirloo et al. |
| 2020/0159225 A1 | 5/2020 | Zeng et al. |
| 2020/0160064 A1 | 5/2020 | Wang et al. |
| 2020/0160104 A1 | 5/2020 | Urtasun et al. |
| 2020/0160117 A1 | 5/2020 | Urtasun et al. |
| 2020/0160178 A1 | 5/2020 | Kar et al. |
| 2020/0160532 A1 | 5/2020 | Urtasun et al. |
| 2020/0160558 A1 | 5/2020 | Urtasun et al. |
| 2020/0160559 A1 | 5/2020 | Urtasun et al. |
| 2020/0160598 A1 | 5/2020 | Manivasagam et al. |
| 2020/0162489 A1 | 5/2020 | Bar-Nahum et al. |
| 2020/0167438 A1 | 5/2020 | Herring |
| 2020/0167554 A1 | 5/2020 | Wang et al. |
| 2020/0174481 A1 | 6/2020 | Van Heukelom et al. |
| 2020/0175326 A1 | 6/2020 | Shen et al. |
| 2020/0175354 A1 | 6/2020 | Volodarskiy et al. |
| 2020/0175371 A1 | 6/2020 | Kursun |
| 2020/0175401 A1 | 6/2020 | Shen |
| 2020/0183482 A1 | 6/2020 | Sebot et al. |
| 2020/0184250 A1 | 6/2020 | Oko |
| 2020/0184333 A1 | 6/2020 | Oh |
| 2020/0192389 A1 | 6/2020 | ReMine et al. |
| 2020/0193313 A1 | 6/2020 | Ghanta et al. |
| 2020/0193328 A1 | 6/2020 | Guestrin et al. |
| 2020/0202136 A1 | 6/2020 | Shrestha et al. |
| 2020/0202196 A1 | 6/2020 | Guo et al. |
| 2020/0209857 A1 | 7/2020 | Djuric et al. |
| 2020/0209867 A1 | 7/2020 | Valois et al. |
| 2020/0209874 A1 | 7/2020 | Chen et al. |
| 2020/0210717 A1 | 7/2020 | Hou et al. |
| 2020/0210769 A1 | 7/2020 | Hou et al. |
| 2020/0210777 A1 | 7/2020 | Valois et al. |
| 2020/0216064 A1 | 7/2020 | du Toit et al. |
| 2020/0218722 A1 | 7/2020 | Mai et al. |
| 2020/0218979 A1 | 7/2020 | Kwon et al. |
| 2020/0223434 A1 | 7/2020 | Campos et al. |
| 2020/0225758 A1 | 7/2020 | Tang et al. |
| 2020/0226377 A1 | 7/2020 | Campos et al. |
| 2020/0226430 A1 | 7/2020 | Ahuja et al. |
| 2020/0238998 A1 | 7/2020 | Dasalukunte et al. |
| 2020/0242381 A1 | 7/2020 | Chao et al. |
| 2020/0242408 A1 | 7/2020 | Kim et al. |
| 2020/0242511 A1 | 7/2020 | Kale et al. |
| 2020/0245869 A1 | 8/2020 | Sivan et al. |
| 2020/0249685 A1 | 8/2020 | Eiluswamy et al. |
| 2020/0250456 A1 | 8/2020 | Wang et al. |
| 2020/0250515 A1 | 8/2020 | Rifkin et al. |
| 2020/0250874 A1 | 8/2020 | Assouline et al. |
| 2020/0257301 A1 | 8/2020 | Weiser et al. |
| 2020/0257306 A1 | 8/2020 | Nisenzon |
| 2020/0258057 A1 | 8/2020 | Farahat et al. |
| 2020/0265247 A1 | 8/2020 | Musk et al. |
| 2020/0272160 A1 | 8/2020 | Djuric et al. |
| 2020/0272162 A1 | 8/2020 | Hasselgren et al. |
| 2020/0272859 A1 | 8/2020 | Iashyn et al. |
| 2020/0273231 A1 | 8/2020 | Schied et al. |
| 2020/0279354 A1 | 9/2020 | Klaiman |
| 2020/0279364 A1 | 9/2020 | Sarkisian et al. |
| 2020/0279371 A1 | 9/2020 | Wenzel et al. |
| 2020/0285464 A1 | 9/2020 | Brebner |
| 2020/0286256 A1 | 9/2020 | Houts et al. |
| 2020/0293786 A1 | 9/2020 | Jia et al. |
| 2020/0293796 A1 | 9/2020 | Sajjadi et al. |
| 2020/0293828 A1 | 9/2020 | Wang et al. |
| 2020/0293905 A1 | 9/2020 | Huang et al. |
| 2020/0294162 A1 | 9/2020 | Shah |
| 2020/0294257 A1 | 9/2020 | Yoo et al. |
| 2020/0294310 A1 | 9/2020 | Lee et al. |
| 2020/0297237 A1 | 9/2020 | Tamersoy et al. |
| 2020/0298891 A1 | 9/2020 | Liang et al. |
| 2020/0301799 A1 | 9/2020 | Manivasagam et al. |
| 2020/0302276 A1 | 9/2020 | Yang et al. |
| 2020/0302291 A1 | 9/2020 | Hong |
| 2020/0302627 A1 | 9/2020 | Duggal et al. |
| 2020/0302662 A1 | 9/2020 | Homayounfar et al. |
| 2020/0304441 A1 | 9/2020 | Bradley et al. |
| 2020/0306640 A1 | 10/2020 | Kolen et al. |
| 2020/0307562 A1 | 10/2020 | Ghafarianzadeh et al. |
| 2020/0307563 A1 | 10/2020 | Ghafarianzadeh et al. |
| 2020/0309536 A1 | 10/2020 | Omari et al. |
| 2020/0309923 A1 | 10/2020 | Bhaskaran et al. |
| 2020/0310442 A1 | 10/2020 | Halder et al. |
| 2020/0311601 A1 | 10/2020 | Robinson et al. |
| 2020/0312003 A1 | 10/2020 | Borovikov et al. |
| 2020/0315708 A1 | 10/2020 | Mosnier et al. |
| 2020/0320132 A1 | 10/2020 | Neumann |
| 2020/0324073 A1 | 10/2020 | Rajan et al. |
| 2020/0327192 A1 | 10/2020 | Hackman et al. |
| 2020/0327443 A1 | 10/2020 | Van et al. |
| 2020/0327449 A1 | 10/2020 | Tiwari et al. |
| 2020/0327662 A1 | 10/2020 | Liu et al. |
| 2020/0327667 A1 | 10/2020 | Arbel et al. |
| 2020/0331476 A1 | 10/2020 | Chen et al. |
| 2020/0334416 A1 | 10/2020 | Vianu et al. |
| 2020/0334495 A1 | 10/2020 | Al et al. |
| 2020/0334501 A1 | 10/2020 | Lin et al. |
| 2020/0334551 A1 | 10/2020 | Javidi et al. |
| 2020/0334574 A1 | 10/2020 | Ishida |
| 2020/0337648 A1 | 10/2020 | Saripalli et al. |
| 2020/0341466 A1 | 10/2020 | Pham et al. |
| 2020/0342350 A1 | 10/2020 | Madar et al. |

(56) References Cited

U.S. PATENT DOCUMENTS

| | | |
|---|---|---|
| 2020/0342548 A1 | 10/2020 | Mazed et al. |
| 2020/0342652 A1 | 10/2020 | Rowell et al. |
| 2020/0348909 A1 | 11/2020 | Das Sarma et al. |
| 2020/0350063 A1 | 11/2020 | Thornton et al. |
| 2020/0351438 A1 | 11/2020 | Dewhurst et al. |
| 2020/0356107 A1 | 11/2020 | Wells |
| 2020/0356790 A1 | 11/2020 | Jaipuria et al. |
| 2020/0356864 A1 | 11/2020 | Neumann |
| 2020/0356905 A1 | 11/2020 | Luk et al. |
| 2020/0361083 A1 | 11/2020 | Mousavian et al. |
| 2020/0361485 A1 | 11/2020 | Zhu et al. |
| 2020/0364481 A1 | 11/2020 | Kornienko et al. |
| 2020/0364508 A1 | 11/2020 | Gurel et al. |
| 2020/0364540 A1 | 11/2020 | Elsayed et al. |
| 2020/0364746 A1 | 11/2020 | Longano et al. |
| 2020/0364953 A1 | 11/2020 | Simoudis |
| 2020/0372362 A1 | 11/2020 | Kim |
| 2020/0372402 A1 | 11/2020 | Kursun et al. |
| 2020/0380362 A1 | 12/2020 | Cao et al. |
| 2020/0380383 A1 | 12/2020 | Kwong et al. |
| 2020/0393841 A1 | 12/2020 | Frisbie et al. |
| 2020/0394421 A1 | 12/2020 | Yu et al. |
| 2020/0394457 A1 | 12/2020 | Brady |
| 2020/0394495 A1 | 12/2020 | Moudgill et al. |
| 2020/0394813 A1 | 12/2020 | Theverapperuma et al. |
| 2020/0396394 A1 | 12/2020 | Zlokolica et al. |
| 2020/0398855 A1 | 12/2020 | Thompson |
| 2020/0401850 A1 | 12/2020 | Bazarsky et al. |
| 2020/0401886 A1 | 12/2020 | Deng et al. |
| 2020/0402155 A1 | 12/2020 | Kurian et al. |
| 2020/0402226 A1 | 12/2020 | Peng |
| 2020/0410012 A1 | 12/2020 | Moon et al. |
| 2020/0410224 A1 | 12/2020 | Goel |
| 2020/0410254 A1 | 12/2020 | Pham et al. |
| 2020/0410288 A1 | 12/2020 | Capota et al. |
| 2020/0410751 A1 | 12/2020 | Omari et al. |
| 2021/0004014 A1 | 1/2021 | Sivakumar |
| 2021/0004580 A1 | 1/2021 | Sundararaman et al. |
| 2021/0004611 A1 | 1/2021 | Garimella et al. |
| 2021/0004663 A1 | 1/2021 | Park et al. |
| 2021/0006835 A1 | 1/2021 | Slattery et al. |
| 2021/0011908 A1 | 1/2021 | Hayes et al. |
| 2021/0012116 A1 | 1/2021 | Urtasun et al. |
| 2021/0012210 A1 | 1/2021 | Sikka et al. |
| 2021/0012230 A1 | 1/2021 | Hayes et al. |
| 2021/0012239 A1 | 1/2021 | Arzani et al. |
| 2021/0015240 A1 | 1/2021 | Elfakhri et al. |
| 2021/0019215 A1 | 1/2021 | Neeter |
| 2021/0026360 A1 | 1/2021 | Luo |
| 2021/0027112 A1 | 1/2021 | Brewington et al. |
| 2021/0027117 A1 | 1/2021 | McGavran et al. |
| 2021/0030276 A1 | 2/2021 | Li et al. |
| 2021/0034921 A1 | 2/2021 | Pinkovich et al. |
| 2021/0042575 A1 | 2/2021 | Firner |
| 2021/0042928 A1 | 2/2021 | Takeda et al. |
| 2021/0046954 A1 | 2/2021 | Haynes |
| 2021/0048984 A1 | 2/2021 | Bannon |
| 2021/0049378 A1 | 2/2021 | Gautam et al. |
| 2021/0049455 A1 | 2/2021 | Kursun |
| 2021/0049456 A1 | 2/2021 | Kursun |
| 2021/0049548 A1 | 2/2021 | Grisz et al. |
| 2021/0049700 A1 | 2/2021 | Nguyen et al. |
| 2021/0056114 A1 | 2/2021 | Price et al. |
| 2021/0056306 A1 | 2/2021 | Hu et al. |
| 2021/0056317 A1 | 2/2021 | Golov |
| 2021/0056420 A1 | 2/2021 | Konishi et al. |
| 2021/0056701 A1 | 2/2021 | Vranceanu et al. |
| 2022/0050806 A1 | 2/2022 | Talpes |

FOREIGN PATENT DOCUMENTS

| | | |
|---|---|---|
| CN | 110599537 A | 12/2010 |
| CN | 102737236 A | 10/2012 |
| CN | 103366339 A | 10/2013 |
| CN | 104835114 A | 8/2015 |
| CN | 103236037 B | 5/2016 |
| CN | 103500322 B | 8/2016 |
| CN | 106419893 A | 2/2017 |
| CN | 106504253 A | 3/2017 |
| CN | 107031600 A | 8/2017 |
| CN | 107169421 A | 9/2017 |
| CN | 107507134 A | 12/2017 |
| CN | 107885214 A | 4/2018 |
| CN | 108122234 A | 6/2018 |
| CN | 107133943 B | 7/2018 |
| CN | 107368926 B | 7/2018 |
| CN | 105318888 B | 8/2018 |
| CN | 108491889 A | 9/2018 |
| CN | 108647591 A | 10/2018 |
| CN | 108710865 A | 10/2018 |
| CN | 105550701 B | 11/2018 |
| CN | 108764185 A | 11/2018 |
| CN | 108845574 A | 11/2018 |
| CN | 108898177 A | 11/2018 |
| CN | 109086867 A | 12/2018 |
| CN | 107103113 B | 1/2019 |
| CN | 109215067 A | 1/2019 |
| CN | 109359731 A | 2/2019 |
| CN | 109389207 A | 2/2019 |
| CN | 109389552 A | 2/2019 |
| CN | 106779060 B | 3/2019 |
| CN | 109579856 A | 4/2019 |
| CN | 109615073 A | 4/2019 |
| CN | 106156754 B | 5/2019 |
| CN | 106598226 B | 5/2019 |
| CN | 106650922 B | 5/2019 |
| CN | 109791626 A | 5/2019 |
| CN | 109901595 A | 6/2019 |
| CN | 109902732 A | 6/2019 |
| CN | 109934163 A | 6/2019 |
| CN | 109948428 A | 6/2019 |
| CN | 109949257 A | 6/2019 |
| CN | 109951710 A | 6/2019 |
| CN | 109975308 A | 7/2019 |
| CN | 109978132 A | 7/2019 |
| CN | 109978161 A | 7/2019 |
| CN | 110060202 A | 7/2019 |
| CN | 110069071 A | 7/2019 |
| CN | 110084086 A | 8/2019 |
| CN | 110096937 A | 8/2019 |
| CN | 110111340 A | 8/2019 |
| CN | 110135485 A | 8/2019 |
| CN | 110197270 B | 9/2019 |
| CN | 110310264 A | 10/2019 |
| CN | 110321965 A | 10/2019 |
| CN | 110334801 A | 10/2019 |
| CN | 110399875 A | 11/2019 |
| CN | 110414362 A | 11/2019 |
| CN | 110426051 A | 11/2019 |
| CN | 110473173 A | 11/2019 |
| CN | 110516665 A | 11/2019 |
| CN | 110543837 A | 12/2019 |
| CN | 110569899 A | 12/2019 |
| CN | 110599864 A | 12/2019 |
| CN | 110619282 A | 12/2019 |
| CN | 110619283 A | 12/2019 |
| CN | 110619330 A | 12/2019 |
| CN | 110659628 A | 1/2020 |
| CN | 110688992 A | 1/2020 |
| CN | 107742311 B | 2/2020 |
| CN | 110751280 A | 2/2020 |
| CN | 110826566 A | 2/2020 |
| CN | 107451659 B | 4/2020 |
| CN | 108111873 B | 4/2020 |
| CN | 110956185 A | 4/2020 |
| CN | 110966991 A | 4/2020 |
| CN | 111027549 A | 4/2020 |
| CN | 111027575 A | 4/2020 |
| CN | 111047225 A | 4/2020 |
| CN | 111126453 A | 5/2020 |
| CN | 111158355 A | 5/2020 |
| CN | 107729998 B | 6/2020 |
| CN | 108549934 B | 6/2020 |
| CN | 111275129 A | 6/2020 |

(56) References Cited

FOREIGN PATENT DOCUMENTS

| | | |
|---|---|---|
| CN | 111275618 A | 6/2020 |
| CN | 111326023 A | 6/2020 |
| CN | 111428943 A | 7/2020 |
| CN | 111444821 A | 7/2020 |
| CN | 111445420 A | 7/2020 |
| CN | 111461052 A | 7/2020 |
| CN | 111461053 A | 7/2020 |
| CN | 111461110 A | 7/2020 |
| CN | 110225341 B | 8/2020 |
| CN | 111307162 B | 8/2020 |
| CN | 111488770 A | 8/2020 |
| CN | 111539514 A | 8/2020 |
| CN | 111565318 A | 8/2020 |
| CN | 111582216 A | 8/2020 |
| CN | 111598095 A | 8/2020 |
| CN | 108229526 B | 9/2020 |
| CN | 111693972 A | 9/2020 |
| CN | 106558058 B | 10/2020 |
| CN | 107169560 B | 10/2020 |
| CN | 107622258 B | 10/2020 |
| CN | 111767801 A | 10/2020 |
| CN | 111768002 A | 10/2020 |
| CN | 111783545 A | 10/2020 |
| CN | 111783971 A | 10/2020 |
| CN | 111797657 A | 10/2020 |
| CN | 111814623 A | 10/2020 |
| CN | 111814902 A | 10/2020 |
| CN | 111860499 A | 10/2020 |
| CN | 111881856 A | 11/2020 |
| CN | 111882579 A | 11/2020 |
| CN | 111897639 A | 11/2020 |
| CN | 111898507 A | 11/2020 |
| CN | 111898523 A | 11/2020 |
| CN | 111899227 A | 11/2020 |
| CN | 112101175 A | 12/2020 |
| CN | 112101562 A | 12/2020 |
| CN | 112115953 A | 12/2020 |
| CN | 111062973 B | 1/2021 |
| CN | 111275080 B | 1/2021 |
| CN | 112183739 A | 1/2021 |
| CN | 112232497 A | 1/2021 |
| CN | 112288658 A | 1/2021 |
| CN | 112308095 A | 2/2021 |
| CN | 112308799 A | 2/2021 |
| CN | 112313663 A | 2/2021 |
| CN | 112329552 A | 2/2021 |
| CN | 112348783 A | 2/2021 |
| CN | 111899245 B | 3/2021 |
| DE | 202017102235 U1 | 5/2017 |
| DE | 202017102238 U1 | 5/2017 |
| DE | 102017116017 A1 | 1/2019 |
| DE | 102018130821 A1 | 6/2020 |
| DE | 102019008316 A1 | 8/2020 |
| EP | 0422348 A2 | 4/1991 |
| EP | 1215626 B1 | 9/2008 |
| EP | 2228666 B1 | 9/2012 |
| EP | 2420408 B1 | 5/2013 |
| EP | 2723069 A1 | 4/2014 |
| EP | 2741253 A1 | 6/2014 |
| EP | 3115772 A1 | 1/2017 |
| EP | 2618559 B1 | 8/2017 |
| EP | 3285485 A1 | 2/2018 |
| EP | 2863633 B1 | 2/2019 |
| EP | 3113080 B1 | 5/2019 |
| EP | 3525132 A1 | 8/2019 |
| EP | 3531689 A1 | 8/2019 |
| EP | 3537340 A1 | 9/2019 |
| EP | 3543917 A1 | 9/2019 |
| EP | 3608840 A1 | 2/2020 |
| EP | 3657387 A1 | 5/2020 |
| EP | 2396750 B1 | 6/2020 |
| EP | 3664020 A1 | 6/2020 |
| EP | 3690712 A1 | 8/2020 |
| EP | 3690742 A1 | 8/2020 |
| EP | 3722992 A1 | 10/2020 |
| EP | 3690730 A2 | 11/2020 |
| EP | 3739486 A1 | 11/2020 |
| EP | 3501897 B1 | 12/2020 |
| EP | 3751455 A2 | 12/2020 |
| EP | 3783527 A1 | 2/2021 |
| GB | 2402572 B | 8/2005 |
| GB | 2548087 A | 9/2017 |
| GB | 2577485 A | 4/2020 |
| GB | 2517270 B | 6/2020 |
| JP | 04-295953 | 10/1992 |
| JP | 2578262 Y2 | 8/1998 |
| JP | 3941252 B2 | 6/2009 |
| JP | 4282583 B2 | 6/2009 |
| JP | 4300098 B2 | 7/2009 |
| JP | 2010-079840 | 4/2010 |
| JP | 2015004922 A | 1/2015 |
| JP | 2015-056124 | 3/2015 |
| JP | 5863536 B2 | 2/2016 |
| JP | 6044134 B2 | 12/2016 |
| JP | 2017-027149 | 2/2017 |
| JP | 6525707 B2 | 6/2019 |
| JP | 2019101535 A | 6/2019 |
| JP | 2020101927 A | 7/2020 |
| JP | 2020173744 A | 10/2020 |
| KR | 100326702 B1 | 2/2002 |
| KR | 101082878 B1 | 11/2011 |
| KR | 101738422 B1 | 5/2017 |
| KR | 101969864 B1 | 4/2019 |
| KR | 101996167 B1 | 7/2019 |
| KR | 102022388 B1 | 8/2019 |
| KR | 102043143 B1 | 11/2019 |
| KR | 102095335 B1 | 3/2020 |
| KR | 102097120 B1 | 4/2020 |
| KR | 1020200085490 A | 7/2020 |
| KR | 102189262 B1 | 12/2020 |
| KR | 1020200142266 A | 12/2020 |
| TW | 200630819 A | 9/2006 |
| TW | I294089 B | 3/2008 |
| TW | I306207 B | 2/2009 |
| WO | WO 94/10638 | 5/1994 |
| WO | WO 02/052835 | 7/2002 |
| WO | WO-2014025765 A2 | 2/2014 |
| WO | WO 16/032398 | 3/2016 |
| WO | WO 16/048108 | 3/2016 |
| WO | WO-2016099779 A1 | 6/2016 |
| WO | WO-2016186811 A1 | 11/2016 |
| WO | WO-2016186823 A1 | 11/2016 |
| WO | WO 16/207875 | 12/2016 |
| WO | WO-2017117186 A1 | 7/2017 |
| WO | WO 17/158622 | 9/2017 |
| WO | WO 19/005547 | 1/2019 |
| WO | WO 19/067695 | 4/2019 |
| WO | WO 19/089339 | 5/2019 |
| WO | WO 19/092456 | 5/2019 |
| WO | WO 19/099622 | 5/2019 |
| WO | WO 19/122952 | 6/2019 |
| WO | WO 19/125191 | 6/2019 |
| WO | WO 19/126755 | 6/2019 |
| WO | WO 19/144575 | 8/2019 |
| WO | WO 19/182782 | 9/2019 |
| WO | WO 19/191578 | 10/2019 |
| WO | WO 19/216938 | 11/2019 |
| WO | WO 19/220436 | 11/2019 |
| WO | WO 20/006154 | 1/2020 |
| WO | WO 20/012756 | 1/2020 |
| WO | WO 20/025696 | 2/2020 |
| WO | WO 20/034663 | 2/2020 |
| WO | WO 20/056157 | 3/2020 |
| WO | WO 20/076356 | 4/2020 |
| WO | WO 20/097221 | 5/2020 |
| WO | WO 20/101246 | 5/2020 |
| WO | WO 20/120050 | 6/2020 |
| WO | WO 20/121973 | 6/2020 |
| WO | WO 20/131140 | 6/2020 |
| WO | WO 20/139181 | 7/2020 |
| WO | WO 20/139355 | 7/2020 |
| WO | WO 20/139357 | 7/2020 |
| WO | WO 20/142193 | 7/2020 |
| WO | WO 20/146445 | 7/2020 |

(56) References Cited

FOREIGN PATENT DOCUMENTS

| | | |
|---|---|---|
| WO | WO 20/151329 | 7/2020 |
| WO | WO 20/157761 | 8/2020 |
| WO | WO 20/163455 | 8/2020 |
| WO | WO 20/167667 | 8/2020 |
| WO | WO 20/174262 | 9/2020 |
| WO | WO 20/177583 | 9/2020 |
| WO | WO 20/185233 | 9/2020 |
| WO | WO 20/185234 | 9/2020 |
| WO | WO 20/195658 | 10/2020 |
| WO | WO 20/198189 | 10/2020 |
| WO | WO 20/198779 | 10/2020 |
| WO | WO 20/205597 | 10/2020 |
| WO | WO 20/221200 | 11/2020 |
| WO | WO 20/240284 | 12/2020 |
| WO | WO 20/260020 | 12/2020 |
| WO | WO 20/264010 | 12/2020 |

OTHER PUBLICATIONS

Cornu et al., "Design, Implementation, and Test of a Multi-Model SYstolic Neural-Network Accelerator", Scientific Programming-Parallel Computing Projects of the Swiss Priority Programme, vol. 5, No. 1, Jan. 1, 1996.

Kim et al., "A Large-scale Architecture for Restricted Boltzmann Machines", Department of Electrical Engineering Stanford University, 2010 18th IEEE Annual International Symposium on, IEEE, Piscataway, NJ, USA, May 2, 010.

Krizhevsky et al., "ImageNet Classification with Deep Convolutional Neural Networks", downloaded from <http://papers.nips.cc/book/advances-in-neural-information-processing-systems-25-2012>, The 26th annual conference on Neural Information Processing Systems: Dec. 3-8, 2012.

Kung S: "VLSI Array Processors", IEEE ASSP Magazine, IEEE. US, vol. 2, No. 3, Jul. 1985.

Sato et al., "An in-depth look at Google's first Tensor Processing Unit (TPU)", posted in Google Cloud Big Data and Machine Learning Blog, downloaded from internet, <URL: https://cloud.google.com/blog/big-data/>, posted May 12, 2017.

Wikipedia, Accumulator (computing), Version from Jul. 14, 2017, 4 pp.

International Search Report and Written Opinion dated Sep. 17, 2018 in PCT/US18/39131.

Jouppi et al., Jun. 26, 2017, In-datacenter performance analysis of a tensor processing unit, 44th International symposium on Computer Architecture IKSCA), Toronto, Canada, 28 pp.

Wikipedia, Booth's multiplication algorithm, Version from May 30, 2017, 5 pp.

Arima et al., Aug. 15, 1994, Recent Topics of Neurochips, System/Control/Information, 38(8):19.

Iwase et al., May 1, 2002, High-speed processing method in SIMD-type parallel computer, Den Journal of the Institute of Electrical Engineers of Japan C, 122-C(5):878-884.

Takahashi, Aug. 2, 1989, Parallel Processing Mechanism, First Edition, Maruzen Co., Ltd., pp. 67-77, 259.

\* cited by examiner

| | Byte 3 | Byte 2 | Byte 1 | Byte 0 |
|---|---|---|---|---|
| 451 | | | | |
| 453 | | RD0 | | |
| 455 | RW1 | | RW0 | |
| 457 | RB3 | RB2 | RB1 | RB0 |
| 463 | | RD1 | | |
| 465 | RW3 | | RW2 | |
| 467 | RB7 | RB6 | RB5 | RB4 |
| 473 | | RD7 | | |
| 475 | RW15 | | RW14 | |
| 477 | RB31 | RB30 | RB29 | RB28 |

Table 450

Figure 4B

VECTOR COMPUTATIONAL UNIT RECEIVING DATA ELEMENTS IN PARALLEL FROM A LAST ROW OF A COMPUTATIONAL ARRAY

CROSS REFERENCE TO OTHER APPLICATIONS

This application claims priority to U.S. Provisional Patent Application No. 62/625,249 entitled INSTRUCTION ARCHITECTURE FOR A VECTOR COMPUTATIONAL UNIT filed Feb. 1, 2018.

BACKGROUND OF THE INVENTION

Processing for machine learning and artificial intelligence typically requires performing mathematical operations on large sets of data and often involves solving multiple convolution layers and pooling layers. Machine learning and artificial intelligence techniques typically utilize matrix operations and non-linear functions such as activation functions. Applications of machine learning include self-driving and driver-assisted automobiles. In some scenarios, computer processors are utilized to perform machine learning training and inference. Traditional computer processors are able to perform a single mathematical operation very quickly but typically can only operate on a limited amount of data simultaneously. As an alternative, graphical processing units (GPUs) may be utilized and are capable of performing the same mathematical operations but on a larger set of data in parallel. By utilizing multiple processor cores, GPUs may perform multiple tasks in parallel and are typically capable of completing large graphics processing tasks that utilized parallelism faster than a traditional computer processor. However, neither GPUs nor traditional computer processors were originally designed for machine learning or artificial intelligence operations. Machine learning and artificial intelligence operations often rely on the repeated application of a set of specific machine learning processor operations over very large datasets. Therefore, there exists a need for a microprocessor system that supports performing machine learning and artificial intelligence specific processing operations on large datasets in parallel without the overhead of multiple processing cores for each parallel operation.

BRIEF DESCRIPTION OF THE DRAWINGS

Various embodiments of the invention are disclosed in the following detailed description and the accompanying drawings.

FIG. 4B is a table illustrating an exemplary aliasing of vector registers.

DETAILED DESCRIPTION

Figure 1:
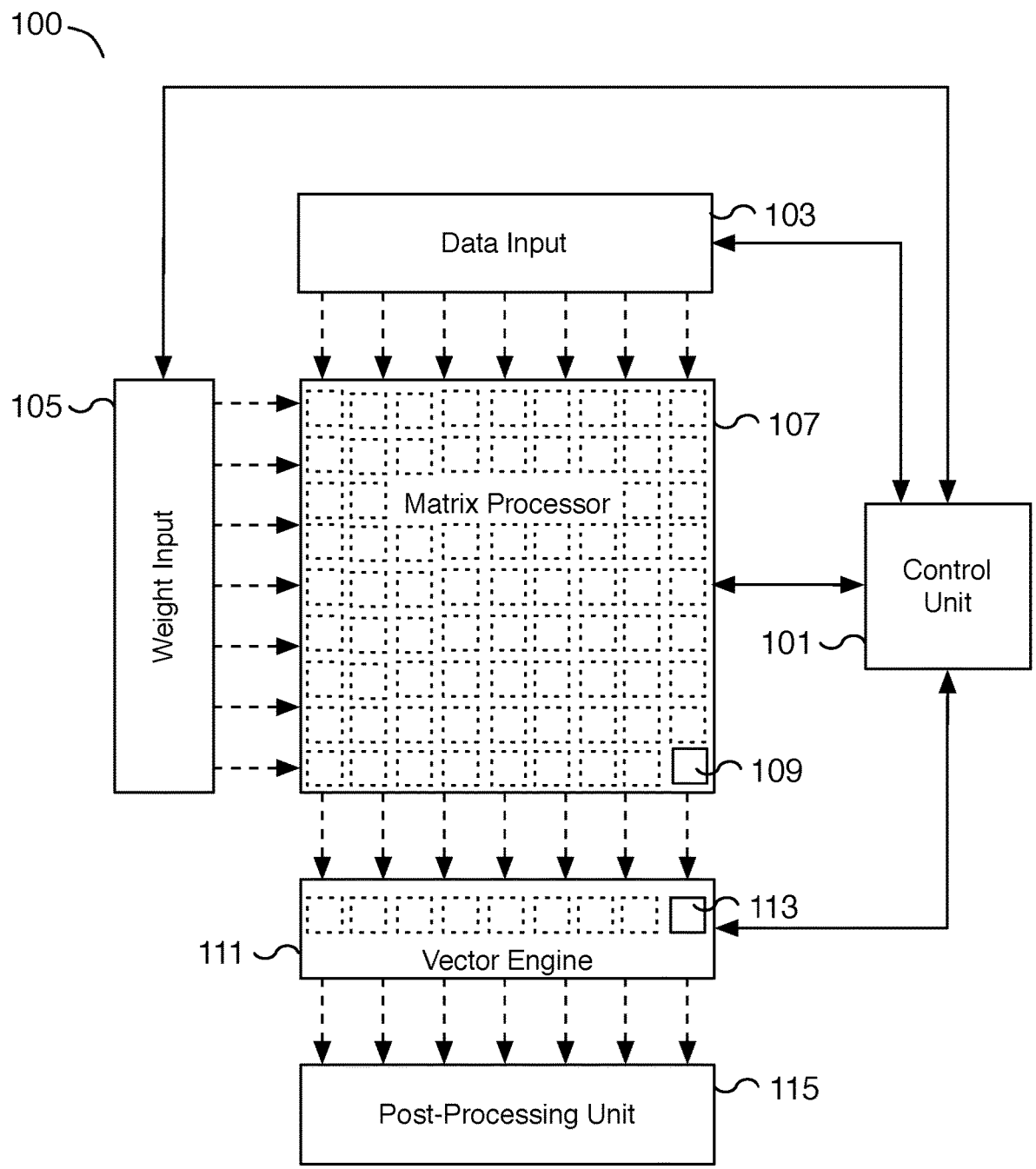
FIG. 1 is a block diagram illustrating an embodiment of a microprocessor system for performing machine learning processing.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A microprocessor system utilizing a vector computational unit and a vector computational unit instruction set architecture is disclosed. For example, a microprocessor system includes a computational array in communication with a vector computational unit. In various embodiments, a computational array is a matrix processor capable of performing arithmetic operations on two input vectors and includes a plurality of computation units to receive the M operands and N operands from the input vectors. In some embodiments, the computation units are sub-circuits that include an arithmetic logic unit, an accumulator, and a shadow register for performing operations such as generating dot-products and performing various processing for convolution. Unlike conventional graphical processing unit (GPU) or central processing unit (CPU) processing cores, where each core is configured to receive its own unique processing instruction, the computation units of the computational array each perform the same computation in parallel in response to an individual instruction received by the computational array. In various embodiments, the vector computational unit includes a plurality of processing elements for performing load, arithmetic, and store operations on a vector of input data in parallel. The processing elements of the vector computational unit are configured to receive an output from the computational array. In various embodiments, the output of the computational array and the input into the vector computational unit is an array of data. The received input to the vector computational unit is processed in parallel in response to a single processor instruction. Similar to the computational array, the processing elements of the vector computational unit each perform the same computation in parallel in response to an individual instruction received by the vector computational unit. In some embodiments, the microprocessor system further includes a control unit configured to provide instructions to the vector computational unit. Each single processor instruction may specify a plurality of component instructions to be executed by the vector computational unit. In response to a single instruction, each of the plurality of processing elements of the vector computational unit processes different data elements of the vector input in parallel with the other processing elements. In some embodiments, the output of the vector computational unit is fed into a post-processing unit for performing post-processing such as pooling operations.

In some embodiments, a microprocessor system comprises at least a computational array and a vector computational unit. For example, a computational array is communicatively connected to a vector computational unit such that the output of the computational array is fed as input to the vector computational unit. In various embodiments, the computational array includes a plurality of computation units. For example, the computation units may be sub-circuits of a matrix processor that include the functionality for performing one or more multiply, add, and shift operations. As another example, computation units may be sub-circuits that include the functionality for performing a dot-product operation. In various embodiments, the computational array includes a sufficient number of computation units for performing multiple operations on the data inputs in parallel. For example, a computational array configured to receive M operands and N operands may include at least M×N computation units. In various embodiments, the microprocessor system further comprises a control unit for coordinating processing between the computational array and a vector computational unit. For example, the control unit may coordinate data from memory to be fed into the computational array, data from the computational array to be fed into the vector computational unit, and/or data from the vector computational unit to be stored in memory or fed into a post-processing unit. In some embodiments, the control unit is configured to provide computational array instructions to the computational array, vector computational unit instructions to the vector computational unit, and/or post-processing instructions to a post-processing unit.

In some embodiments, the vector computational unit in communication with the computational array includes a plurality of processing elements configured to receive as input the output data elements from the computational array. For example, a vector computational unit, such as a vector engine, receives as input a vector for processing. The vector computational unit may include a processing element for each element of the input vector. An example vector computational unit configured to receive a vector of N elements (or operands) may include N processing elements for processing the N elements in parallel. In various embodiments, the processing elements are configured to receive output data elements from the computational array. For example, the output from the computational array may be a vector of data elements that are fed to be received by the processing elements of the vector computational unit. In various embodiments, each vector computational unit processes in parallel the received output data elements from the computational array in response to a single processor instruction. For example, a single processor instruction is applied to each of the processing elements of the vector computational unit to be performed on the corresponding data element.

In some embodiments, a control unit is configured to provide at least a single processor instruction to the vector computational unit. The single processor instruction specifies a plurality of component instructions to be executed by the vector computational unit (e.g., in response to the single processor instruction). For example, a control unit provides to the vector computational unit a single vector instruction, such as an instruction triad, that includes multiple component instructions. In some embodiments, an instruction triad is a simple processor instruction that includes up to three component instructions, such as a separate load instruction, arithmetic logic unit (ALU) instruction, and store instruction. The three component instructions are received and executed by the vector computational unit (e.g., in response to the instruction triad). For example, a vector computational unit receiving an instruction triad that bundles a load instruction, an ALU instruction, and a store instruction executes the load instruction, the arithmetic instruction, and the store instruction. In various embodiments, in response to the single processor instruction, the plurality of processing elements of the vector computational unit are configured to process different data elements in parallel with other processing elements. For example, each processing element is capable of processing in parallel a different data element from the input vector to the vector computational unit. As another example, each of the component instructions of a single vector processor instruction triad may be applied to each of the elements of a vector input to complete the processing of an entire input vector of N elements in parallel using the vector computational unit.

Figure 5:
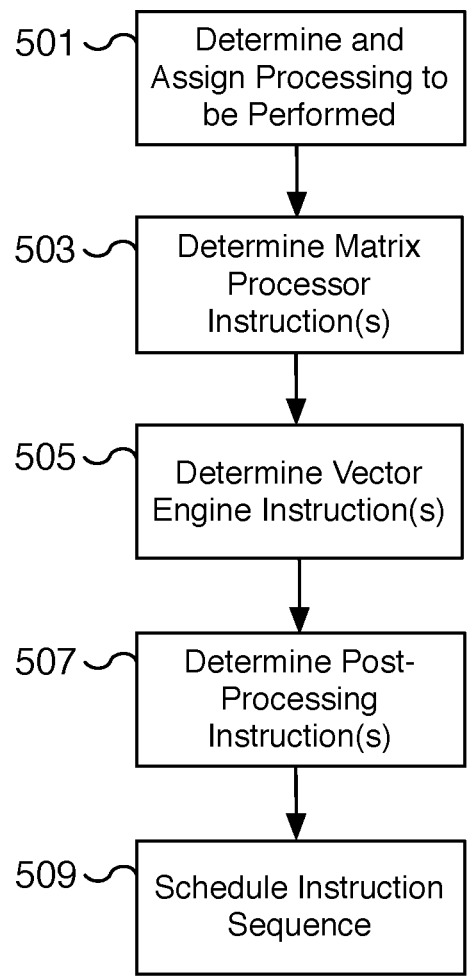
FIG. 5 is a flow diagram illustrating an embodiment of a process for determining processor instructions for a microprocessor system.

FIG. 1 is a block diagram illustrating an embodiment of a microprocessor system for performing machine learning processing. In the example shown, microprocessor system 100 includes control unit 101, data input 103, weight input 105, matrix processor 107, vector engine 111, and post-processing unit 115. Data input 103 and weight input 105 are input modules for preparing data for matrix processor 107. In some embodiments, data input 103 and weight input 105 each include an input data formatter, a cache or buffer, and/or a logic circuit for preparing data for matrix processor 107. For example, data input 103 may prepare N operands from a two-dimensional array corresponding to image data and weight input 105 may prepare M operands corresponding to a vector of weight values to be processed by matrix processor 107. In some embodiments, the process of FIG. 5 is performed to prepare instructions for operating on microprocessor system 100, including matrix processor instructions for matrix processor 107 and vector engine instructions for vector engine 111. In some embodiments, microprocessor system 100, including vector engine 111, performs the processes described below with respect to FIGS. 6A, 6B, and 8.

In some embodiments, matrix processor 107 is a computational array that includes a plurality of computation units. For example, a matrix processor receiving M operands and N operands from weight input 105 and data input 103, respectively, includes M×N computation units. In the figure shown, the small squares inside matrix processor 107 depict that matrix processor 107 includes a logical two-dimensional array of computation units. Computation unit 109 is one of a plurality of computation units of matrix processor 107. In some embodiments, each computation unit is configured to receive one operand from data input 103 and one operand from weight input 105. In some embodiments, the computation units are configured according to a logical two-dimensional array but the matrix processor is not necessarily fabricated with computation units laid out as a physical two-dimensional array. For example, the i-th operand of data input 103 and the j-th operand of weight input 105 are configured to be processed by the i-th×j-th computation unit of matrix processor 107.

In various embodiments, the data width of components data input 103, weight input 105, matrix processor 107, vector engine 111, and post-processing unit 115 are wide data widths and include the ability to transfer more than one operand in parallel. In some embodiments, data input 103 and weight input 105 are each 96-bytes wide. In some embodiments, data input 103 is 192-bytes wide and weight input 105 is 96-bytes wide. In various embodiments, the width of data input 103 and weight input 105 is dynamically configurable. For example, data input 103 may be dynamically configured to 96 or 192 bytes and weight input 105 may be dynamically configured to 96 or 48 bytes. In some embodiments, the dynamic configuration is controlled by control unit 101. In various embodiments, a data width of 96 bytes allows 96 operands to be processed in parallel. For example, in an embodiment with data input 103 configured to be 96-bytes wide, data input 103 can transfer 96 operands to matrix processor 107 in parallel.

In various embodiments, matrix processor 107 is configured to receive N bytes from data input 103 and M bytes from weight input 105 and includes at least M×N computation units. For example, matrix processor 107 may be configured to receive 96 bytes from data input 103 and 96 bytes from weight input 105 and includes at least 96×96 computation units. As another example, matrix processor 107 may be configured to receive 192 bytes from data input 103 and 48 bytes from weight input 105 and includes at least 192×48 computation units. In various embodiments, the dimensions of matrix processor 107 may be dynamically configured. For example, the default dimensions of matrix processor 107 may be configured to receive 96 bytes from data input 103 and 96 bytes from weight input 105 but the input dimensions may be dynamically configured to 192 bytes and 48 bytes, respectively. In various embodiments, the output size of each computation unit is equal to or larger than the input size. For example, in some embodiments, the input to each computation unit is two 1-byte operands, one corresponding to an operand from data input 103 and one from weight input 105, and the output of processing the two operands is a 4-byte result. As another example, matrix processor 107 may be configured to receive 96 bytes from data input 103 and 96 bytes from weight input 105 and output 96 4-byte results. In some embodiments, the output of matrix processor 107 is a vector. For example, a matrix processor configured to receive two 96-wide input vectors, where each element (or operand) of the input vector is one byte in size, can output a 96-wide vector result where each element of the vector result is 4-bytes in size.

In various embodiments, each computation unit of matrix processor 107 is a sub-circuit that includes an arithmetic logic unit, an accumulator, and a shadow register. In the example shown, the computation units of matrix processor 107 can perform an arithmetic operation on the M operands and N operands from weight input 105 and data input 103, respectively. In various embodiments, each computation unit is configured to perform one or more multiply, add, accumulate, and/or shift operations. In some embodiments, each computation unit is configured to perform a dot-product operation. For example, in some embodiments, a computation unit may perform multiple dot-product component operations to calculate a dot-product result. For example, the array of computation units of matrix processor 107 may be utilized to perform convolution steps required for performing inference using a machine learning model. A two-dimensional data set, such as an image, may be formatted and fed into matrix processor 107 using data input 103, one vector at a time. In parallel, a vector of weights may be applied to the two-dimensional data set by formatting the weights and feeding them as a vector into matrix processor 107 using weight input 105. Corresponding computation units of matrix processor 107 perform a matrix processor instruction on the corresponding operands of the weight and data inputs in parallel.

In some embodiments, vector engine 111 is a vector computational unit that is communicatively coupled to matrix processor 107. Vector engine 111 includes a plurality of processing elements including processing element 113. In the figure shown, the small squares inside vector engine 111 depict that vector engine 111 includes a plurality of processing elements arranged as a vector. In some embodiments, the processing elements are arranged in a vector in the same direction as data input 103. In some embodiments, the processing elements are arranged in a vector in the same direction as weight input 105. In various embodiments, the data size of the processing elements of vector engine 111 is the same size or larger than the data size of the computation units of matrix processor 107. For example, in some embodiments, computation unit 109 receives two operands each 1 byte in size and outputs a result 4 bytes in size. Processing element 113 receives the 4-byte result from computation unit 109 as an input 4 bytes in size. In various embodiments, the output of vector engine 111 is the same size as the input to vector engine 111. In some embodiments, the output of vector engine 111 is smaller in size compared to the input to vector engine 111. For example, vector engine 111 may receive up to 96 elements each 4 bytes in size and output 96 elements each 1 byte in size. In various embodiments, vector engine 111 performs quantization on the output result resulting in the output of vector engine 111 being smaller in size compared to the input to vector engine 111. In various embodiments, the quantization is performed as part of a single instruction. For example, a quantization and a non-linear function are performed as a single processor instruction. As described above, in some embodiments, the communication channel from data input 103 and weight input 105 to matrix processor 107 is 96-elements wide with each element 1 byte in size and matches the output size of vector engine 111 (96-elements wide with each element 1 byte in size).

In some embodiments, the processing elements of vector engine 111, including processing element 113, each include an arithmetic logic unit (ALU) (not shown). For example, in some embodiments, the ALU of each processing element is capable of performing arithmetic operations. In some embodiments, each ALU of the processing elements is capable of performing in parallel a rectified linear unit (ReLU) function and/or scaling functions. In some embodiments, each ALU is capable of performing a non-linear function including non-linear activation functions. In various embodiments, each processing element of vector engine 111 includes one or more flip-flops for receiving input operands. In some embodiments, each processing element has access to a slice of a vector engine accumulator and/or vector registers of vector engine 111. For example, a vector engine capable of receiving 96-elements includes a 96-element wide accumulator and one or more 96-element vector registers. Each processing element has access to a one-element slice of the accumulator and/or vector registers. In some embodiments, each element is 4-bytes in size. In various embodiments, the accumulator and/or vector registers are sized to fit at least the size of an input data vector. In some embodiments, vector engine 111 includes additional vector registers sized to fit the output of vector engine 111.

In some embodiments, the processing elements of vector engine 111 are configured to receive data from matrix processor 107 and each of the processing elements can process the received portion of data in parallel. As one example of a processing element, processing element 113 of vector engine 111 receives data from computation unit 109 of matrix processor 107. In various embodiments, vector engine 111 receives a single vector processor instruction and in turn each of the processing elements performs the processor instruction in parallel with the other processing elements. In some embodiments, the processor instruction includes one or more component instructions, such as a load, a store, and/or an arithmetic logic unit operation. In various embodiments, a no-op operation may be used to replace a component instruction.

In the example shown, the dotted arrows between data input 103 and matrix processor 107, weight input 105 and matrix processor 107, matrix processor 107 and vector engine 111, and vector engine 111 and post-processing unit 115 depict a coupling between the respective pair of components that is capable of sending multiple data elements such as a vector of data elements. As an example, the communication channel between matrix processor 107 and vector engine 111 may be 96×32 bits wide and support transferring 96 elements in parallel where each element is 32 bits in size. As another example, the communication channel between vector engine 111 and post-processing unit 115 may be 96×1 byte wide and support transferring 96 elements in parallel where each element is 1 byte in size. In various embodiments, data input 103 and weight input 105 are coupled to a memory module (not shown in FIG. 1) and may each receive input data from the memory module. In some embodiments, vector engine 111 is additionally coupled to a memory module (not shown in FIG. 1) and may receive input data from the memory module in addition or alternatively to input from matrix processor 107. In the various embodiments, a memory module is typically a static random access memory (SRAM).

In some embodiments, one or more computation units of matrix processor 107 may be grouped together into a lane such that matrix processor 107 has multiple lanes. In various embodiments, the lanes of matrix processor 107 may be aligned with either data input 103 or weight input 105. For example, a lane aligned with weight input 105 includes a set of computation units that are configured to receive as input every operand of weight input 105. Similarly, a lane aligned with data input 103 includes a set of computation units that are configured to receive as input every operand of data input 103. In the example shown in FIG. 1, the lanes are aligned along weight input 105 in a vertical column and each lane feeds to a corresponding lane of vector engine 111. In some embodiments, each lane is a vertical column of sub-circuits that include multiply, add and/or accumulate, and shift functionality. In some embodiments, matrix processor 107 includes a matrix of tiles and each tile is a matrix of computation units. For example, a 96×96 matrix processor may include a matrix of 6×6 tiles, where each tile includes 16×16 computation units. In some embodiments, a vertical lane is a single column of tiles. In some embodiments, a horizontal lane is a single row of tiles. In various embodiments, the dimensions of the lane may be configured dynamically and may be utilized for performing alignment operations on the input to matrix processor 107, vector engine 111, and/or post-processing unit 115. In some embodiments, the dynamic configuration is performed by or using control unit 101 and/or with using processor instructions controlled by control unit 101.

In some embodiments, control unit 101 synchronizes the processing performed by matrix processor 107, vector engine 111, and post-processing unit 115. For example, control unit 101 may send processor specific instructions to each of matrix processor 107, vector engine 111, and post-processing unit 115. Control unit 101 may send matrix processor instructions to matrix processor 107. A matrix processor instruction may be a computational array instruction that instructs a computational array to perform an arithmetic operation, such as a dot-product or dot-product component, using specified operands from data input 103 and/or weight input 105. Control unit 101 may send vector processor instructions to vector engine 111. For example, a vector processor instruction may include a single processor instruction with a plurality of component instructions to be executed together by the vector computational unit. Control unit 101 may send post-processing instructions to post-processing unit 115. In various embodiments, control unit 101 synchronizes data that is fed to matrix processor 107 from data input 103 and weight input 105, to vector engine 111 from matrix processor 107, and to post-processing unit 115 from vector engine 111. In some embodiments, control unit 101 synchronizes the data between different components of microprocessor system 100 including between data input 103, weight input 105, matrix processor 107, vector engine 111, and/or post-processing unit 115 by utilizing processor specific memory, queue, and/or dequeue operations. In some embodiments, data and instruction synchronization is performed by control unit 101. In some embodiments, data and instruction synchronization is performed by control unit 101 that includes one or more sequencers to synchronize processing between matrix processor 107, vector engine 111, and/or post-processing unit 115.

In some embodiments, matrix processor 107 and vector engine 111 are utilized for processing convolution layers. In some embodiments, vector engine 111 is utilized for performing non-linear functions such as an activation function on the output of matrix processor 107. For example, matrix processor 107 may be used to calculate a dot-product and vector engine 111 may be used to perform an activation function such as a rectified linear unit (ReLU) or sigmoid function. In some embodiments, post-processing unit 115 is utilized for performing pooling operations. In some embodiments, post-processing unit 115 is utilized for formatting and storing the processed data to memory and may be utilized for synchronizing memory writing latency.

Figure 2:
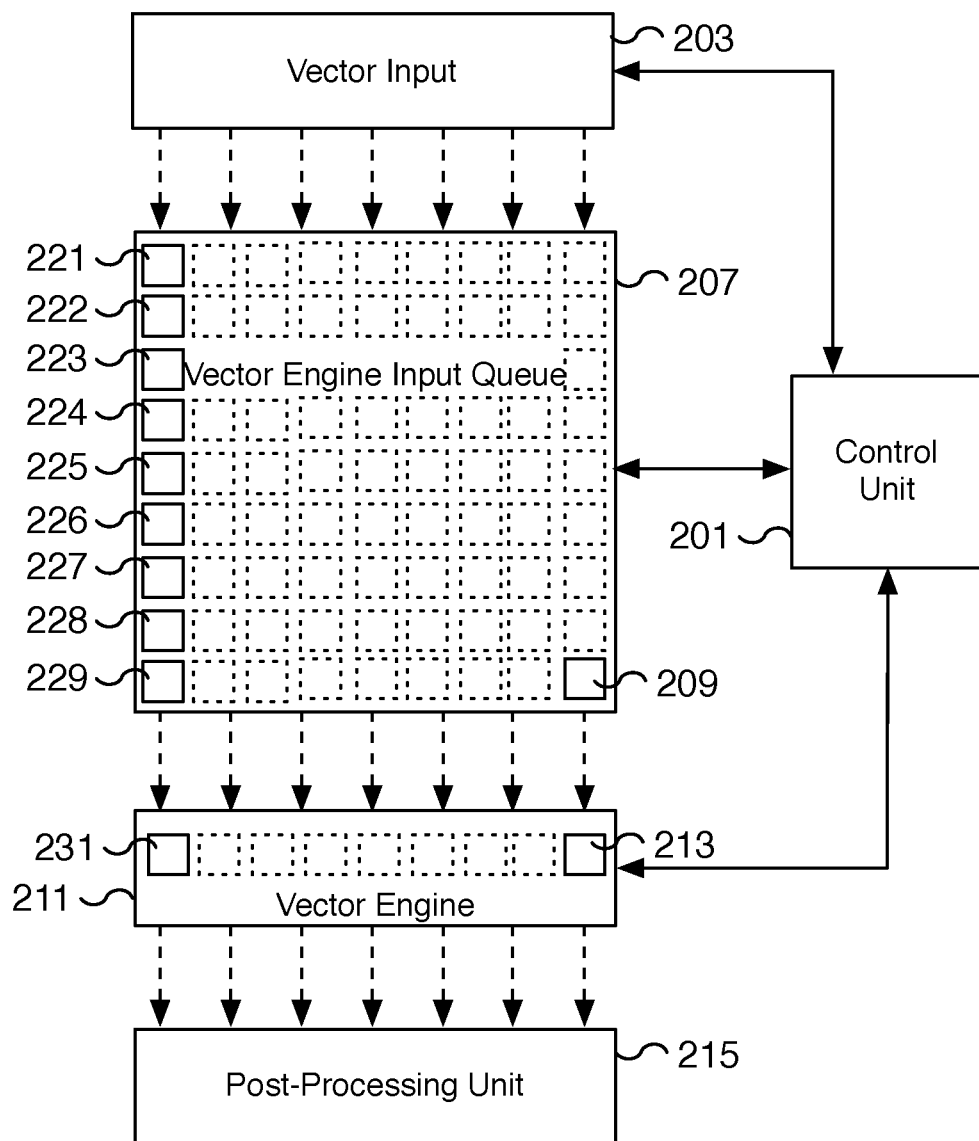
FIG. 2 is a block diagram illustrating an embodiment of a microprocessor system for performing machine learning processing.

FIG. 2 is a block diagram illustrating an embodiment of a microprocessor system for performing machine learning processing. In the example shown, microprocessor system 200 includes control unit 201, vector input 203, vector engine input queue 207, vector engine 211, and post-processing unit 215. Vector engine input queue 207 includes a plurality of computation units including computation units 209 and 221-229 and vector engine 211 includes a plurality of processing elements including processing elements 213 and 231. Vector input 203 is an input module for feeding data into vector engine input queue 207. In some embodiments, vector input 203 includes an input data formatter, a cache or buffer, and/or a logic circuit for preparing data for vector engine input queue 207. For example, vector input 203 may prepare N operands from a two-dimensional array to be processed by vector engine 211 utilizing vector engine input queue 207 as a first-in-first-out (FIFO) input queue. In some embodiments, vector input 203 is coupled to memory (not shown in FIG. 2), such as static random access memory (SRAM) for retrieving data.

In various embodiments, control unit 201, vector input 203, vector engine input queue 207, vector engine 211, and post-processing unit 215 are, respectively, control unit 101, data input 103, matrix processor 107, vector engine 111, and post-processing unit 115 of FIG. 1. For example, matrix processor 107 of FIG. 1 may be used to implement an input queue such as vector engine input queue 207 by receiving data from data input 103 of FIG. 1 and repeatedly shifting each vector of input towards vector engine 111 of FIG. 1.

In some embodiments, vector engine input queue 207 is a computational array unit and includes a matrix of computation units whose columns are first-in-first-out (FIFO) queues. In the example shown, vector engine input queue 207 is an input queue for vector input 203 and functions as a wide first-in-first-out (FIFO) queue to feed multiple data elements from vector input 203 to vector engine 211. For example, computation units 221-229 make up a vertical column of computation units that work together as a single FIFO queue. In various embodiments, vector engine input queue 207 includes multiple FIFO queues made up of vertical columns of computation units similar to computation units 221-229. For example, in an embodiment where vector engine input queue 207 is 96 computation units wide, vector engine input queue 207 has 96 vertical columns of computation units that correspond to 96 FIFO queues. As a further example, in an embodiment where vector engine input queue 207 is 96 computation units long, vector engine input queue 207 has FIFO queues that are 96 stages long.

In various embodiments, each first-in-first-out (FIFO) queue works in parallel and shifts input received from the vector input 203 along the FIFO queue to vector engine 211. The first row of computation units of vector engine input queue 207, which includes computation unit 221, is connected to the vector input 203. The first row of computation units is configured to receive an entire row of data from vector input 203 in parallel. The last row of computation units of vector engine input queue 207 is connected to the row of processing elements of vector engine 211. For example, the last row of computation units of vector engine input queue 207 includes computation units 229 and 209. Computation unit 209 is connected to processing element 213 and computation unit 229 is connected to processing element 231. Processing elements 213 and 231 are configured to receive the data output elements of computation units 209 and 229, respectively. The processing elements of vector engine 211 receive an entire row of data from the last row of computation units of vector engine input queue 207 in parallel. In various embodiments, when the last row of computation units of vector engine input queue 207 has data available to dequeue, a dequeue ready signal is received by vector engine 211 to indicate the vector engine input queue 207 is ready to receive a queue operation.

In the example described, the data from the first row of computation units is shifted down the column to the next row of computation units in the logical direction towards vector engine 211. For example, an input corresponding to a data element of vector input 203 is received as an operand at computation unit 221 and shifted from computation unit 221 to computation unit 222, from computation unit 222 to computation unit 223, from computation unit 223 to computation unit 224, and so forth, until an operand received at computation unit 221 is incrementally shifted from computation unit 221 to computation unit 229 via the intermediate computation units 222-228. In various embodiments, a data element pushed into the FIFO takes as many shifts as the FIFO is deep in computation units. For example, a FIFO queue with 96 computation units and 96 stages long requires 96 shifts to dequeue an inserted element. In various embodiments, each stage of the FIFO can shift an operand in parallel with the other stages. For example, while each intermediate computation unit in the FIFO queue shifts its operand to the next computation unit, the first computation unit can retrieve the next data element from vector input 203 and the last computation unit can dequeue its data element to be received by the corresponding processing element of vector engine 211. In the example described, each computation unit along each row of computation units works in parallel to shift its corresponding data element originally received from vector input 203 to vector engine 211.

In some embodiments, vector engine input queue 207 is coupled to vector input 203 and one dimension of the matrix of computation units matches the dimension of vector input 203. For example, in an embodiment with vector input 203 having a width of 96 bytes, vector engine input queue 207 has a matrix of computation units with a width of at least 96 bytes. In some embodiments, the width of vector input 203 and the corresponding width of the inputs to vector engine input queue 207 are dynamically configurable. For example, vector input 203 can be dynamically configured to 96 bytes or 96×2 bytes and the corresponding width of inputs to vector engine input queue 207 are configurable to 96 bytes or 96×2 bytes, respectively. In some embodiments, the configuration is performed using control unit 201 and/or processor instructions to vector engine input queue 207.

In some embodiments, vector engine 211 is a vector computational unit that is communicatively coupled to vector engine input queue 207. Vector engine 211 includes a plurality of processing elements including processing elements 213 and 231. In the figure shown, the small squares inside vector engine 211 depict that vector engine 211 includes a plurality of processing elements arranged as a vector. In some embodiments, the processing elements are arranged in a vector in the same direction as vector input 203. In various embodiments, the data size of the processing elements of vector engine 211 is the same size or larger than the data size of the computation units of vector engine input queue 207. For example, in some embodiments, computation unit 209 receives an operand 1 byte in size and dequeues an output to processing element 213 also having a size of 1 byte. Processing element 213 receives the 1 byte output from computation cell 209 as an input 1 byte in size. In various embodiments, the output of vector engine 211 is the same size as the input to vector engine 211. In various embodiments, the output of vector engine 211 is smaller in size as compared to the input to vector engine 211. For example, vector engine 211 may receive up to 96 elements each 4 bytes in size and output 96 elements each 1 byte in size. In some embodiments, the communication channel from vector input 203 to vector engine input queue 207 is 96 elements wide with each element 1 byte in size and matches the output size of vector engine 211 (96 elements wide with each element 1 byte in size).

In some embodiments, the processing elements of vector engine 211, including processing elements 213 and 231, each include an arithmetic logic unit (not shown) and are described in further detail with respect to vector engine 111 of FIG. 1. In some embodiments, the processing elements of vector engine 211 are configured to receive data from vector engine input queue 207 and each of the processing elements can process the received portion of data in parallel. As one example of a processing element, processing elements 213 and 231 of vector engine 211 receive data from computation units 209 and 229, respectively, of vector engine input queue 207. In various embodiments, vector engine 211 receives a single vector processor instruction and in turn each of the processing elements performs the processor instruction in parallel with the other processing elements. In some embodiments, the processor instruction includes one or more component instructions, such as a load, a store, and/or an arithmetic logic unit operation. In various embodiments, a no-op operation may be used to replace a component instruction.

In the example shown, the dotted arrows between vector input 203 and vector engine input queue 207, vector engine input queue 207 and vector engine 211, and vector engine 211 and post-processing unit 215 depict a coupling between the respective pair of components that is capable of sending multiple data elements. As an example, the communication channel between vector engine input queue 207 and vector engine 211 may be 96×32 bits wide and support transferring 96 elements in parallel where each element is 32 bits in size. As another example, the communication channel between vector engine 211 and post-processing unit 215 may be 96×1 byte wide and support transferring 96 elements in parallel where each element is 1 byte in size. In various embodiments, vector input 203 is coupled to a memory module (not shown in FIG. 2) and may receive input data from the memory module. In some embodiments, vector engine 211 is additionally coupled to a memory module (not shown in FIG. 1) and may receive input data from the memory module in addition or alternatively to input from vector engine input queue 207. In the various embodiments, a memory module is typically a static random access memory (SRAM).

In some embodiments, one or more computation units of vector engine input queue 207 may be grouped together into a vertical column such that vector engine input queue 207 has multiple vertical column lanes. In the example shown in FIG. 2, the lanes are aligned along the same vertical columns as the first-in-first-out (FIFO) queues described above and each lane feeds to a corresponding lane of vector engine 211. In some embodiments, each lane is a vertical column of sub-circuits that include multiply, add and/or accumulate, and shift functionality. In some embodiments, a vertical lane is a single column of computation units. In some embodiments, a vertical lane is a group of multiple columns of adjacent computation units. In various embodiments, the dimensions of the lane may be configured dynamically and may be utilized for performing alignment operations on the input to vector engine input queue 207, vector engine 211, and/or post-processing unit 215. In some embodiments, the dynamic configuration is performed by or using control unit 201 and/or with using processor instructions controlled by control unit 201.

In some embodiments, control unit 201 synchronizes the processing performed by vector engine input queue 207, vector engine 211, and/or post-processing unit 215. For example, control unit 201 may send processor specific instructions to each of vector engine input queue 207, vector engine 211, and post-processing unit 215. Control unit 201 may send vector engine input queue instructions to vector engine input queue 207. In some embodiments, vector engine input queue instructions are a subset of the matrix processor instructions that matrix processor 107 of FIG. 1 is capable of responding to and is described further with respect to FIG. 1. A vector engine input queue instruction may be a computational array instruction that instructs a computational array to perform a load operation, a shift operation, or other appropriate instruction for interfacing with an input queue. Control unit 201 may send vector processor instructions to vector engine 211. For example, a vector processor instruction may include a single processor instruction with a plurality of component instructions to be executed together by the vector computational unit. Control unit 201 may send post-processing instructions to post-processing unit 215. In various embodiments, control unit 201 synchronizes data that is fed to vector engine input queue 207 from vector input 203, to vector engine 211 from vector engine input queue 207, and to post-processing unit 215 from vector engine 211. In some embodiments, control unit 201 synchronizes the data between different components vector input 203, vector engine input queue 207, vector engine 211, and/or post-processing unit 215 by utilizing processor specific memory, queue, and/or dequeue operations. The functionality of control unit 201 is described in further detail with respect to control unit 101 of FIG. 1.

In some embodiments, control unit 201 is utilized to configure the size and number of data elements to be received by vector engine input queue 207, vector engine 211, and/or post-processing unit 215. For example, in some embodiments, control unit 201 may be utilized to configure the input to vector engine input queue 207 as 96 elements each of size 1 byte or other appropriate variations such as 48 elements each of size 2 bytes, 96 elements each of size 2 bytes, 192 elements each of size 4 bits, etc. In some embodiments, vector engine input queue 207 is able to output a data element with a size larger than it can receive by performing a sequence of load and logical shift operations. For example, a 4-byte input data element is loaded into vector engine input queue 207 by reading four sequential 1-byte portions of the 4-byte input data element and logically shifting each byte to the appropriate bit fields. As another example, in some embodiments, control unit 201 may be utilized to configure the input to vector engine 211 as 96 elements each of size 4 bytes, or other appropriate variations such as 96 elements each of size 1 byte, 48 elements each of size 2 bytes, etc.

In various embodiments, post-processing unit 215 is utilized to perform post-processing of output from vector engine 211. The post-processing functionality of post-processing unit 215 is described in further detail with respect to post-processing unit 115 of FIG. 1.

Figure 3:
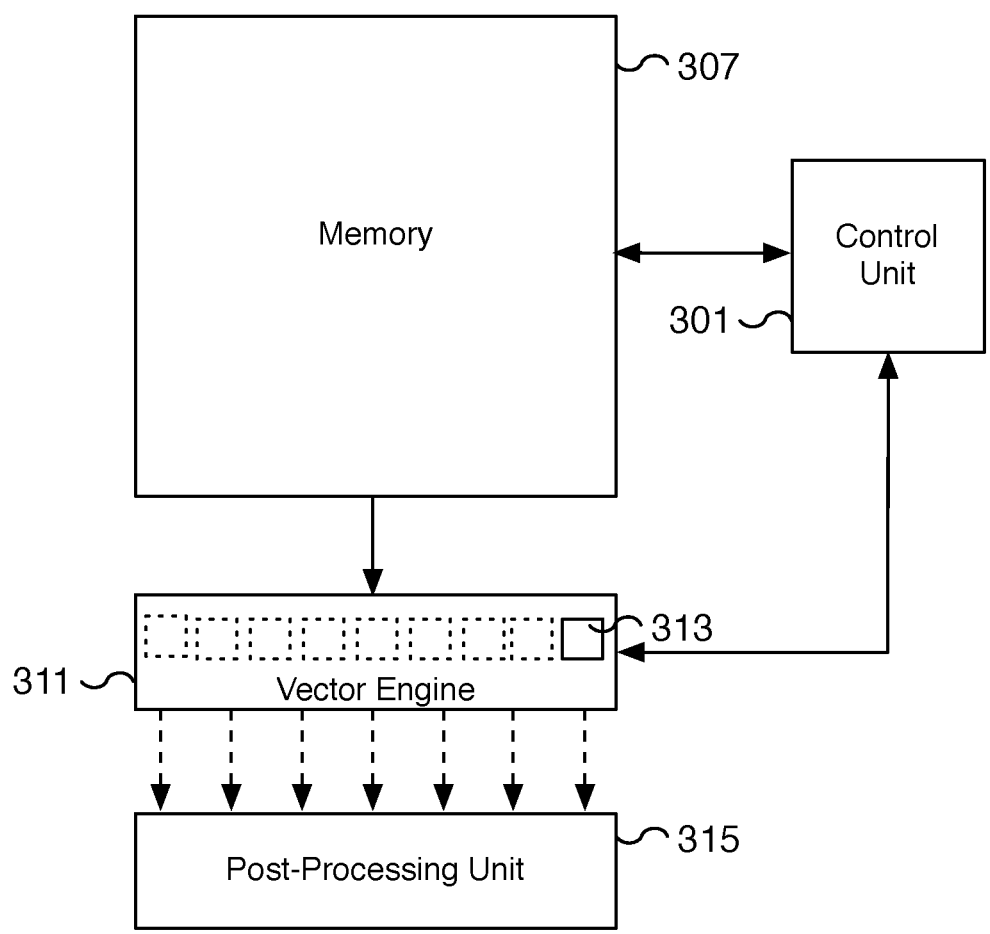
FIG. 3 is a block diagram illustrating an embodiment of a microprocessor system for performing machine learning processing.

FIG. 3 is a block diagram illustrating an embodiment of a microprocessor system for performing machine learning processing. In the example shown, microprocessor system 300 includes control unit 301, memory 307, vector engine 311, and post-processing unit 315. In various embodiments, memory 307 is typically a static random access memory (SRAM). In various embodiments, post-processing unit 315 received input data from vector engine 311 and is utilized to perform post-processing of output from vector engine 311. The post-processing functionality of post-processing unit 315 is described in further detail with respect to post-processing unit 115 of FIG. 1.

The block diagram of FIG. 3 depicts a system architecture embodiment where vector engine 311 is coupled to memory 307 and may retrieve data directly from memory 307. In various embodiments, the size of the communication channel between memory 307 and vector engine 311 may be configured to transfer multiple data elements in parallel from memory 307 to vector engine 311. For example, in an embodiment where vector engine 311 is capable of receiving 96 elements each of 32 bits in size in parallel, the size of the communication channel between memory 307 and vector engine 311 is configured to transfer 96 elements each of 32 bits in size from memory 307 to vector engine 311 in parallel. In some embodiments, memory 307 includes a data formatter (not shown) which may include a data cache or buffer and/or a logic circuit for formatting data from memory prior to transfer to vector engine 311. For example, data elements of size 1 byte may be stored on word boundaries in memory 307 and the data formatter is utilized to format and/or mask the data to byte boundaries. In various embodiments, control unit 301, vector engine 311, and post-processing unit 315 are, respectively, control unit 101, vector engine 111, and post-processing unit 115 of FIG. 1. In various embodiments, vector engine 311 may be further coupled to a matrix processor (not shown) as described with respect to matrix processor 107 of FIG. 1.

In some embodiments, vector engine 311 is a vector computational unit that is communicatively coupled to memory 307. Vector engine 311 includes a plurality of processing elements including processing element 313. In the figure shown, the small squares inside vector engine 311 depict that vector engine 311 includes a plurality of processing elements arranged as a vector. In some embodiments, the processing elements of vector engine 311, including processing element 313, each include an arithmetic logic unit (not shown). The processing elements of vector engine 311 are configured to receive data from memory 307 and each of the processing elements can process the received portion of data in parallel. In various embodiments, vector engine 311 receives a single vector processor instruction and in turn each of the processing elements performs the processor instruction in parallel with the other processing elements. In some embodiments, the processor instruction includes one or more component instructions, such as a load, a store, and/or an arithmetic logic unit operation. The functionality of vector engine 311 is described in further detail with respect to vector engine 111 and 211 of FIGS. 1 and 2, respectively.

In some embodiments, control unit 301 synchronizes the processing performed by vector engine 311 and post-processing unit 315, and access to memory 307. For example, control unit 301 may send processor specific instructions to each of vector engine 311 and post-processing unit 315. In some embodiments, control unit 301 may send vector processor instructions to vector engine 311. For example, a vector processor instruction may include a single processor instruction with a plurality of component instructions to be executed together by the vector computational unit. In some embodiments, control unit 301 may send post-processing instructions to post-processing unit 315. In various embodiments, control unit 301 synchronizes data that is received by vector engine 311 from memory 307 and received by post-processing unit 315 from vector engine 311. In some embodiments, control unit 301 synchronizes the data between different components vector engine 311 and/or post-processing unit 315 by utilizing vector engine and/or post-processing unit processor specific operations. The functionality of control unit 301 is described in further detail with respect to control unit 101 of FIG. 1.

In some embodiments, control unit 301 is utilized to configure the size and number of data elements to be received by vector engine 311 and/or post-processing unit 315. For example, in some embodiments, control unit 301 may be utilized to configure vector engine 311 to receive 96 data elements each of size 4 bytes, or other appropriate variations such as 96 elements each of size 1 byte, 48 elements each of size 2 bytes, etc. As described further with respect to FIGS. 1 and 2, the dotted arrows between vector engine 311 and post-processing unit 315 depict a coupling between the respective pair of components that is capable of sending multiple data elements. As an example, the communication channel between vector engine 311 and post-processing unit 315 may be 96×1 byte wide and support transferring 96 elements in parallel where each element is 1 byte in size.

Figure 4A:
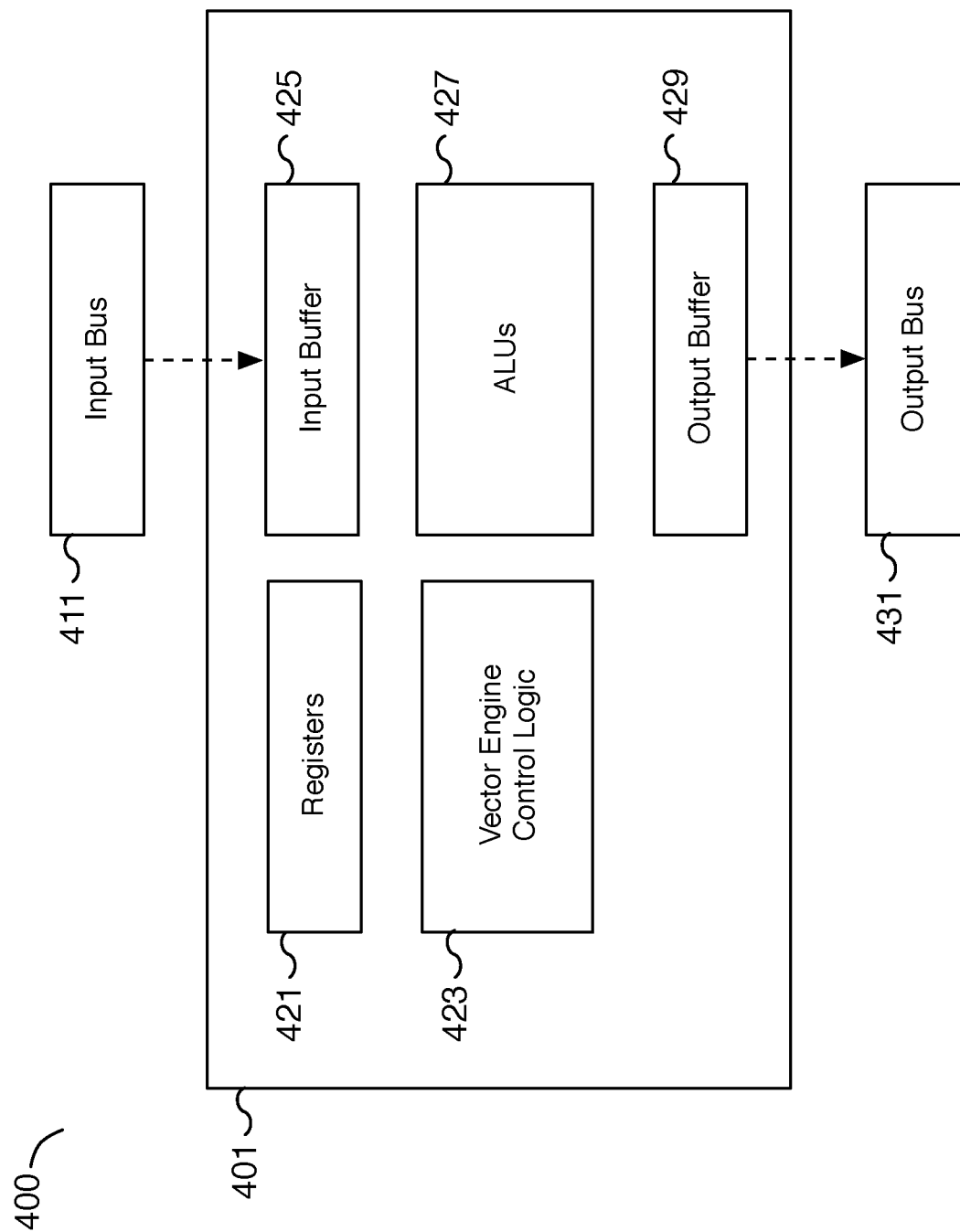
FIG. 4A is a block diagram illustrating an embodiment of a vector computational unit for performing machine learning processing.

FIG. 4A is a block diagram illustrating an embodiment of a vector computational unit for performing machine learning processing. In the example shown, microprocessor system 400 includes vector computational unit 401, input bus 411, and output bus 431. Input to vector computational unit 401 arrives from input bus 411. Output from vector computational unit 401 is written to output bus 431. In some embodiments, input bus 411 and output bus 431 are a single bus that includes the functionality of both input bus 411 and output bus 431. In various embodiments, input bus 411 and output bus 431 are wide data buses that allow the transfer of multiple data elements in parallel. For example, input bus 411 may be 96×32 bits wide and output bus 431 may be 96 bytes wide to accommodate the parallel processing functionality of computational unit 401. In some embodiments, vector computational unit 401 receives vector computational unit instructions via input bus 411. In some embodiments, vector computational unit 401 receives vector computational unit instructions via a communication channel other than input bus 411 such as an instruction bus (not shown).

In various embodiments, vector computational unit 401 is vector engine 111, 211, and/or 311 of FIGS. 1, 2, and 3, respectively. In some embodiments, input bus 411 is connected to matrix processor 107 of FIG. 1, vector engine input queue 207 of FIG. 2, and/or memory 307 of FIG. 3. In some embodiments, output bus 431 is connected to post-processing units 115, 215, and/or 315 of FIGS. 1, 2, and 3, respectively. In various embodiments, vector computational unit 401 is bi-directionally coupled to a control unit (not shown) of microprocessor system 400 external to vector computational unit 401, such as control units 101, 201, and/or 301 of FIGS. 1, 2, and 3, respectively. In various embodiments, the control unit of microprocessor system 400 sends vector computational unit instructions to vector computational unit 401. In some embodiments, the control unit of microprocessor system 400 includes one or more sequencers for synchronizing instructions and data to vector computational unit 401.

In the example shown, vector computational unit 401 includes registers 421, vector engine control logic 423, input buffer 425, arithmetic logic units (ALUs) 427, and output buffer 429. Input data from input bus 411 is received by input buffer 425 and output written to output bus 431 is written from output buffer 429. In some embodiments, input buffer 425 and output buffer 429 are data buffers or caches and provide memory synchronization functionality. For example, in some embodiments, input reads from input bus 411 and/or output writes to output bus 431 have an unpredictable latency that can be smoothed out by utilizing input buffer 425 to receive input data and output buffer 429 for storing calculated results. As another example, output bus 431 may not be available when output from ALUs 427 is ready for writing. In some embodiments, output buffer 429 allows ALUs 427 to continue processing pending data until output bus 431 is available for writing the results stored at output buffer 429. In various embodiments, input bus 411 and output bus 431 are communication channels controlled by a control unit (not shown) of microprocessor system 400.

As described above, in various embodiments, a vector computational unit includes a plurality of processing elements. In some embodiments, each processing element includes individual functionality for loading data, storing data, and performing arithmetic logic unit operations. The individual processing elements are not depicted in the block diagram of FIG. 4A. In various embodiments, arithmetic logic units (ALUs) 427 include the corresponding arithmetic logic unit (ALU) of each processing unit. Similarly, input buffer 425 and output buffer 429 include corresponding input buffers and output buffers for each processing unit. In various embodiments, ALUs 427 include ALU logic for processing every element of an input vector to vector computational unit 401 in parallel. In some embodiments, ALUs 427 include logic for quantizing the ALU result. In various embodiments, the ALU logic, for example, logic for performing a non-linear function and quantization, can be performed in response to a single processor instruction.

In various embodiments, registers 421 includes registers for implementing the functionality of vector computational unit 401. For example, registers 421 may be used to store operands for performing vector computational unit instructions, to implement bit masks, and to reference vector elements using different memory-sized register aliases, among other appropriate functionality. In some embodiments, registers 421 include arithmetic instruction vector registers; mask registers; registers for performing arithmetic operations such as add, subtract, and floating point operations; and/or registers for aliasing vector elements. In some embodiments, the registers used for aliasing vector elements are also utilized for performing arithmetic operations.

In some embodiments, registers 421 include arithmetic instruction vector registers. For example, registers may be used as operands for load operations, store operations, and arithmetic logic unit (ALU) operations. As another example, in some embodiments, an ALU operation may take as arguments up to four vector registers, three as source registers and one as a destination register. In various embodiments, the vector registers used by processor operations are aliased to different vector elements based on the size of the vector element. For example, in some embodiments, a different set of vector registers are available for operating on 8-bit, 16-bit, 32-bit, and/or floating point values. In some embodiments, the set of vector registers for 32-bit values is also used for floating point values. In various embodiments, 32-bit vector registers are aliased to 16-bit vector registers and 8-bit vector registers. For example, one 32-bit vector register is aliased to two 16-bit vector registers and four 8-bit vector registers. As another example, a vector computational unit 401 with eight 96×32-bit vector registers (registers RD0-RD7) is aliased to sixteen 96×16-bit vector registers (registers RW0-RW15), and thirty-two 96×8-bit vector registers (registers RB0-RB31). RD0 is a 96×32-bit vector register, RW0 is a 96×16-bit vector register, and RB0 is a 96×8-bit vector register. A further example of vector register aliasing is depicted in FIG. 4B.

In some embodiments, registers 421 include one or more bit mask registers based on the number of processing elements of vector computational unit 401. For example, a vector computational unit with 96 processing elements may include one or more 96-bit mask registers. In various embodiments, a mask register may be set by loading a bit-mask from memory. A mask register may be used to store the results of logical operations performed on input data to vector computational unit 401.

In some embodiments, registers 421 include registers for performing arithmetic operations such as add, subtract, and floating point operations. For example, in some embodiments, vector computational unit 401 includes registers for storing carry-out bits for vector add and subtract instructions and status bits corresponding to floating point instructions.

In some embodiments, vector computational unit 401 includes an instruction buffer (not shown) for storing a sequence of vector computational unit instructions. In some embodiments, the instruction buffer is a command queue. In various embodiments, the instruction buffer includes one or more pointers to reference the current and/or last instruction to be performed. In various embodiments, the instruction buffer acts as a cache of vector computational unit instructions. For example, one or more vector computational unit instructions are loaded into an instruction buffer of vector computational unit 401 and cached until the instructions can be executed. As instructions are executed and no longer needed, new instructions may be loaded into the instruction buffer. In some embodiments, the vector computational unit instructions are received from an external instruction command queue via a control logic (not shown) of microprocessor system 400.

In some embodiments, vector computational unit 401 includes a vector engine control logic 423. Vector engine control logic 423 is utilized to implement the functionality of the vector computational unit 401 including fetching vector computational unit instructions, decoding the instructions, and/or executing the instructions. In various embodiments, the vector engine control logic 423 includes logic for reading, writing, masking, and/or aliasing the data via input buffer 425, output buffer 429, and registers 421. In some embodiments, vector computational unit 401 receives a dequeue ready signal and determines using vector engine control logic 423 that data is available via input bus 411. For example, vector engine control logic 423 may dequeue data from an input first-in-first-out queue (not shown) attached to input bus 411 on receipt of a dequeue ready signal.

FIG. 4B is a table illustrating an exemplary aliasing of vector registers. Table 450 illustrates the aliasing of vector registers for a vector computational unit embodiment with eight 96×32-bit vector registers (registers RD0-RD7) aliased to sixteen 96×16-bit vector registers (registers RW0-RW15), and thirty-two 96×8-bit vector registers (registers RB0-RB31). In some embodiments, the vector registers in Table 450 are the vector registers of registers 421 of vector computational unit 401 of FIG. 4A. In the example shown, row 451 includes columns for the bytes 0, 1, 2, and 3 that are aliased to the respective registers listed in the rows below it. Rows 453, 463, and 473 correspond to 96×32-bit vector registers RD0, RD1, and RD7. Rows 455, 465, and 475 correspond to 96×16-bit vector registers RW0-3 and RW14-15. Rows 457, 467, and 477 correspond to 96×8-bit vector registers RB0-7 and RB28-31. In the example, bytes 0-3 are one of the 96 lanes of a vector computational unit such as vector engine 111, 211, and/or 311 of FIGS. 1, 2, and 3, respectively.

In the example shown, table 450 illustrates vector register aliasing for a single lane of the 96 lanes of a vector computational unit embodiment. The 96×32-bit vector register RD0 utilizes four bytes ordered from byte 0 to byte 3. The 96×16-bit vector registers RW0 and RW1 are aliased to 2 bytes each. Vector register RW0 is aliased to byte 0 and byte 1 and vector register RW1 is aliased to byte 2 and byte 3. The 96×8-bit vector registers RB0-RB3 are aliased to 1 byte each corresponding to bytes 0-3, respectively. Similarly, the 96×32-bit vector register RD1 is aliased to the 96×16-bit vector registers RW2 (bytes 0 and 1) and RW3 (bytes 2 and 3), and the 96×8-bit vector registers RB4-RB7 for bytes 0-3, respectively. As another example, the 96×32-bit vector register RD7 is aliased to the 96×16-bit vector registers RW14 (bytes 0 and 1) and RW15 (bytes 2 and 3), and the 96×8-bit vector registers RB28-RB31 for bytes 0-3, respectively.

In various embodiments, vector computational unit instructions operate on all 96 lanes of a vector register in parallel. For example, for each of the 96 lanes, vector register RB0 operates on byte 0, vector register RB5 operates on byte 1, vector register RW2 operates on bytes 0 and 1, vector register RW15 operates on bytes 2 and 3, and vector register RD7 operates on bytes 0-3 in parallel.

FIG. 5 is a flow diagram illustrating an embodiment of a process for determining processor instructions for a microprocessor system. In some embodiments, the process of FIG. 5 converts a software program written with a high level programming language into a sequence of computational array and vector computational unit instructions for a microprocessor system with a computational array and a vector computational unit. In various embodiments, the microprocessor system is microprocessor system 100 of FIG. 1, a computational array is matrix processor 107 of FIG. 1, and a vector computational unit is vector engine 111 of FIG. 1. In various embodiments, the process of FIG. 5 is utilized to implement applications relying on machine learning including applications that perform inference using a machine learning model such as self-driving and driver-assisted automobiles.

At 501, a determination is made on the processing to be performed and the subset of processing to be assigned to different co-processing components such as a computational array, a vector computational unit, and/or a post-processing unit. In various embodiments, the processing is assigned based on the functionality and efficiency of the different co-processing components. For example, certain matrix-related operations are assigned to a computational array and operations involving non-linear functions such as activation functions may be assigned to a vector computational unit. In some embodiments, pooling operations are assigned to a post-processing unit. As another example, in some embodiments, at 501, a determination is made that a convolution operation requires a dot-product operation and that the dot-product operation best utilizes matrix processing performed by a computational array. In some embodiments, this determination is performed by compiling a machine learning application to target the microprocessor system described herein.

At 503, one or more matrix processor instructions are determined that correspond to the processing determined and assigned at 501. For example, the dot-product operation determined at 501 to be performed by a matrix processor is converted to one or more matrix processer instructions. In various embodiments, the matrix processor instructions are computational array instructions. As an example, the computational array instructions may require that one or more data vectors are received from a data input component, such as data input 103 of FIG. 1, and one or more weight vectors are received from a corresponding weight input component, such as weight input 105 of FIG. 1. Additional computational array instructions may include the multiply, accumulate, and shift operations for processing a dot-product operation. For example, one or more dot-product component operations may be used to calculate a dot-product result. In various embodiments, the computational array instructions are directed to processing performed on received input data by the corresponding computation units of the computational array. In some embodiments, additional computational array instructions include instructions for preparing the dot-product result for processing by the vector computational unit.

At 505, a determination is made regarding the vector engine instructions to be performed by the vector computational unit. For example, operations related to an activation function determined at 501 to be performed by a vector engine are converted to one or more vector engine instructions. In various embodiments, the vector engine instructions are vector computational unit instructions. As an example, the vector computational unit instructions may require that one or more data vectors are received from a computational array, such as matrix processor 107 of FIG. 1. Additional vector computational unit instructions may include operations for performing a non-linear activation function, such as a rectified linear unit (ReLu) function. In various embodiments, the vector computational unit instructions are directed to processing performed on received input data by the corresponding processing elements of the vector computational unit. In some embodiments, additional vector computational unit instructions include instructions for preparing the result of the processing elements for post-processing by the post-processing unit.

In various embodiments, each vector computational unit instruction is a single processor instruction that specifies a plurality of component instructions to be executed together by the vector computational unit. The execution of the plurality of component instructions is performed by the processing elements of the vector computational unit in parallel on different data input elements in response to a single vector computational unit instruction. For example, in some embodiments, a single processor instruction includes three component instructions: a separate load, arithmetic logic unit, and store instruction. The three component instructions are received and executed by the vector computational unit. In some embodiments, the bundling of component instructions into a single processing instruction is performed at 505. In various embodiments, the order and selection of component instructions for bundling into a vector computational unit instruction is based on determined data hazards.

At 507, a determination is made regarding the post-processing instructions to be performed by the post-processing unit. For example, operations related to post-processing functionality are determined at 501 to be performed by a post-processing unit and are converted to one or more post-processing instructions. As an example, the post-processing instructions may require that one or more data vectors are received from a vector computational unit, such as vector engine 111 of FIG. 1. Additional post-processing instructions may include operations for performing pooling layer functionality, such as a maxpooling. In various embodiments, post-processing instructions may include instructions for configuring the pooling functionality such as kernel size, stride, and/or spatial extent, among others. In some embodiments, additional post-processing instructions include instructions for preparing and writing out the results of post-processing.

At 509, the sequence corresponding to the execution of the collection of co-processor instructions determined at 503, 505, and 507 is scheduled. For example, the relative order and/or sequence of the respective processor instructions for the various co-processors, such as computational array, a vector computational unit, and/or a post-processing unit, is determined. In some embodiments, the sequence depends on the interaction and dependencies between the co-processors. For example, the input to a vector computational unit may depend on the availability of output results from a computational array. In various embodiments, dependencies including data hazards are determined and accounted for. For example, in various embodiments, vector computational unit instructions include a plurality of component instructions and can be executed such that multiple vector computational unit instructions are executed in parallel. Data hazards based on unavailable data resources are determined and accounted for. For example, no-ops may be inserted into the component instructions of a vector computational unit instruction to allow a load operation to complete before an arithmetic logic unit operation that depends on the completion of the load operation is performed. In some embodiments, the bundling of component instructions into a single vector computational unit instruction is determined at 509. In some embodiments, some or all of the instruction scheduling, such as the ordering of co-processor instructions, is performed at 503 and 505 for a matrix processor and vector engine, respectively. For example, in some embodiments, the bundling of component instructions for each single vector computational unit instruction is determined at 505.

In some embodiments, a control unit and/or one or more sequencers of a microprocessor system are utilized to initiate and coordinate the processing of the collection of co-processor instructions. For example, the instruction sequence determined at 509 is utilized by a control unit, such as control unit 101 of FIG. 1, and/or by one or more sequencers to issue the corresponding co-processor instructions to a computational array such as matrix processor 107 of FIG. 1, a vector computational unit such as vector engine 111 of FIG. 1, and/or a post-processing unit such as post-processing unit 113 of FIG. 1. In some embodiments, the functionality of one or more sequencers is performed by a control unit. For example, in some embodiments, the control unit includes an execute sequencer, memory access sequencers, network sequencers, and/or vector engine sequencers, among others.

Figure 6A:
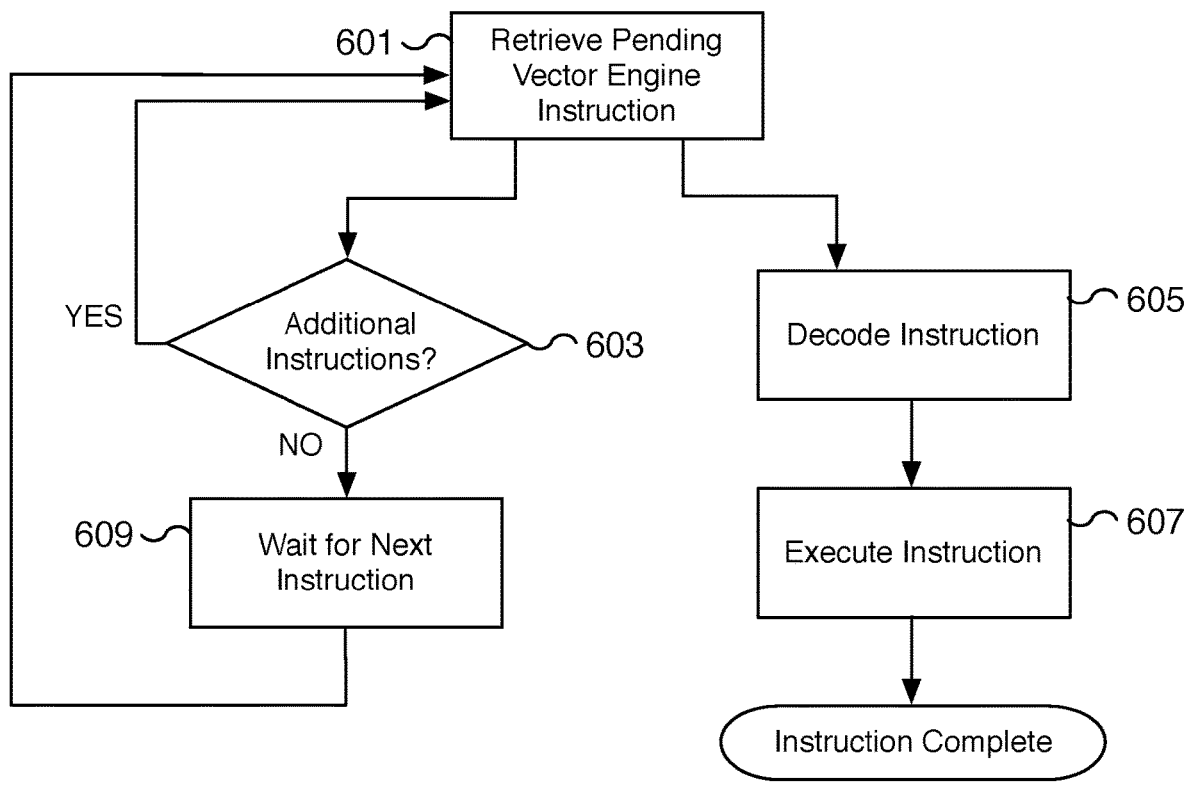
FIG. 6A is a flow diagram illustrating an embodiment of a process for the running execution of a vector computational unit.

FIG. 6A is a flow diagram illustrating an embodiment of a process for the running execution of a vector computational unit. The process of FIG. 6A may be performed by a vector computational unit to process elements of a vector in parallel. In various embodiments, a vector computational unit is vector engine 111, 211, 311, and/or vector computational unit 401 of FIGS. 1, 2, 3, and 4A, respectively. In some embodiments, the process of FIG. 6A is initiated by a control unit such as control unit 101 of FIG. 1. In various embodiments, the transition between the steps of the process in FIG. 6A is performed by a control logic of the vector computational unit such as vector engine control logic 423 of FIG. 4A.

At 601, a vector engine instruction is retrieved. In various embodiments, a vector engine instruction is a vector computational unit instruction and specifies a plurality of component instructions. For example, an instruction triad is a single vector computational unit instruction specifying up to three component instructions. An example instruction triad includes a load operation, an arithmetic logic unit operation, and a store operation as a single instruction. At 601, once the instruction is retrieved, the process continues to both 603 and 605.

At 603, a determination is made as to whether additional instructions are pending. For example, the next vector engine instruction may be available and ready for retrieving. As another example, an instruction buffer for caching pending instructions may be empty and requires retrieving and/or waiting for the next available instruction. In some embodiments, the availability of additional instructions is based on inspecting a pointer referencing the last valid instruction in the instruction buffer. Processing proceeds to step 609 in response to no available additional instructions. Processing proceeds back to 601 in response to the availability of one or more additional instructions.

At 605, the vector engine instruction retrieved at 601 is decoded. In various embodiments, a single vector engine instruction specifies one or more component instructions. In various embodiments, the instruction and the component instructions are decoded. For example, an instruction triad containing a load, an arithmetic logic unit, and a store component instruction is decoded into the separate component operations. In some embodiments, the decoding determines both the opcode and the arguments corresponding to the opcode for each component operation. As one example, a load component instruction contains both the opcode corresponding to a byte vector dequeue operation and the corresponding destination vector register to store the vector of bytes as a result of the dequeue. As another example, an add component instruction contains both the opcode corresponding to a signed 16-bit add operation and the corresponding vector registers for the source and destination arguments.

At 607, the instruction decoded at 605 is executed. In some embodiments, a single vector engine instruction, which specifies multiple component instructions, is executed by the processing elements of the vector computational unit. For example, a vector of processing elements executes the single vector engine instruction decoded at 605. In some embodiments, each of the component instructions of the single vector engine instruction is further executed in parallel by each of the processing elements. For example, for each processing element, a load instruction and an arithmetic logic unit instruction may be executed in parallel. In some embodiments, a load instruction, an arithmetic logic unit instruction, and a store instruction may be executed in parallel. For example, the following component operations are performed in parallel by each processing cell of the vector engine: a vector of input data is loaded from an input accumulator into a vector register, a floating point multiply operation is performed on two different vector registers by an arithmetic logic unit (ALU), and a vector of 16-bit elements is stored from a vector register to memory. In various embodiments, once the processing elements have finished execution of component instructions, the processing for the vector engine instruction is complete.

At 609, the vector computational unit waits for the next instruction. For example, the vector computational unit waits until an instruction buffer for caching pending instructions contains a valid instruction to be executed. As another example, the vector computational unit waits until the next instruction is received from memory and made available to the vector computational unit. In some embodiments, the vector computational unit halts at 609 pending the availability of an additional instruction. In various embodiments, the vector computational unit may respond to interrupts at 609 while waiting for an additional instruction. In response to the arrival of an additional instruction, processing continues back to 601.

Figure 6B:
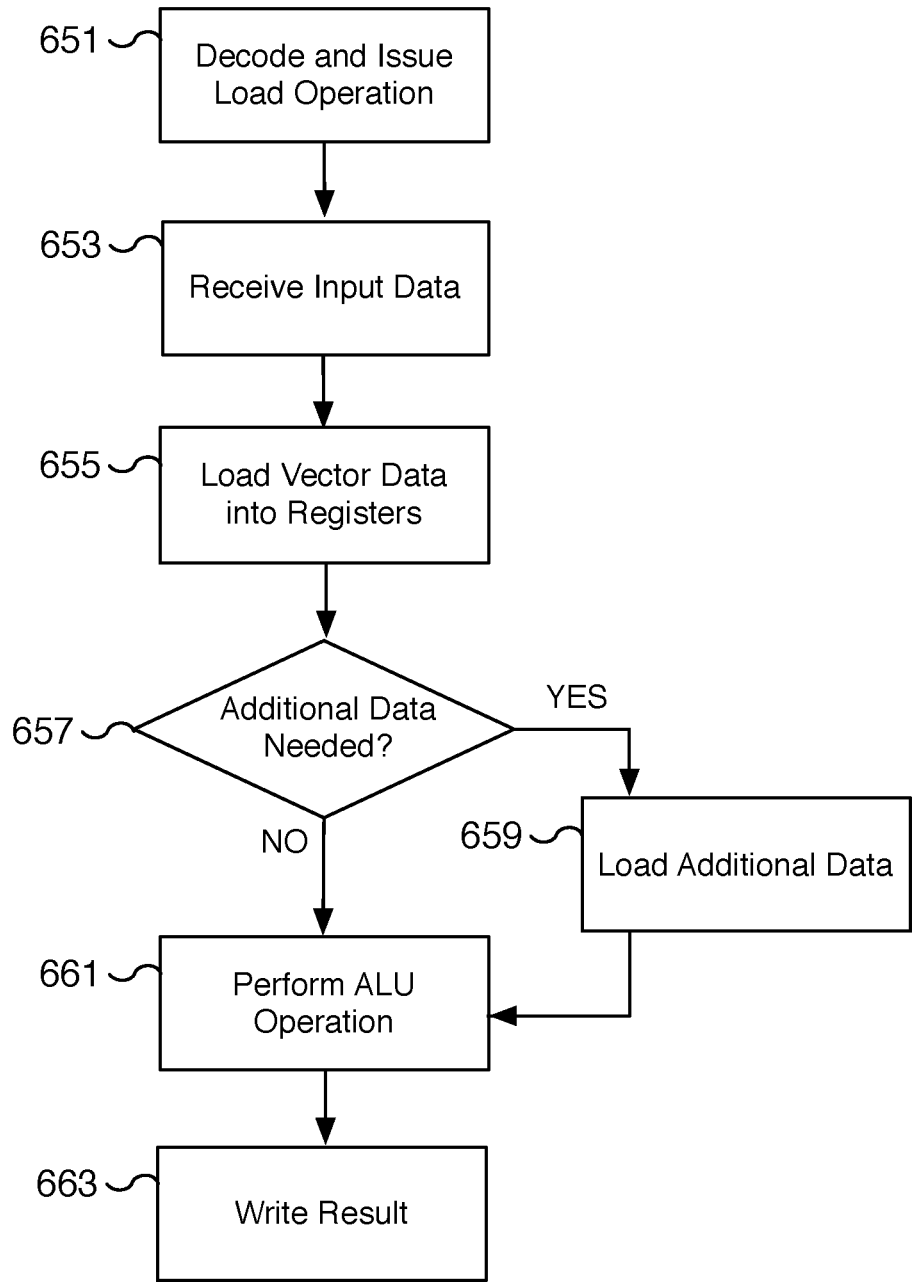
FIG. 6B is a flow diagram illustrating an embodiment of a process for processing vector data by a vector computational unit.

FIG. 6B is a flow diagram illustrating an embodiment of a process for processing vector data by a vector computational unit. For example, FIG. 6B illustrates the process applied to vector data received by a vector computational unit from an input source such as a computational array and/or a first-in-first-out (FIFO) queue. In some embodiments, the process of FIG. 6B illustrates the steps performed by a vector computational unit for performing a vector operation on a vector input to compute a vector result. In various embodiments, the process of FIG. 6B utilizes a plurality of processing elements of a vector computational unit to perform processing on elements of a vector in parallel. In various embodiments, vector computational unit is vector engine 111, 211, 311, and/or vector computational unit 401 of FIGS. 1, 2, 3, and 4A, respectively.

At 651, a load operation is decoded and issued. In some embodiments, a load operation is required to receive data into a vector computational unit. For example, in some embodiments, a dequeue operation is a load operation that dequeues a vector of data elements from a computational array to be received by the processing elements of the vector computational unit. In various embodiments, the load operation may be one of multiple component instructions that make up a single vector computational unit instruction. The decoding of the load operation determines the specific type of load operation and the appropriate operations. For example, various load operations exist to load different sized vector elements into different specified vector registers. At 651, the load operation is decoded and issued to initiate the receiving of input data such as the dequeuing of a vector of data results from a first-in-first-out (FIFO) queue.

At 653, the vector computational unit receives input data in the form of a vector as a result of the load operation issued at 651. For example, the vector computation unit receives a vector of input data elements from a computational array, such as matrix processor 107 of FIG. 1, a first-in-first-out (FIFO) queue, such as vector engine input queue 207 of FIG. 2, or other appropriate data source. In some embodiments, the input data is stored in an input buffer. In some embodiments, the input buffer utilizes a set of flip-flops and/or one or more accumulators to store the input data. An input buffer the size of the input vector may be utilized to store the input data so that it can be loaded into one or more vector registers at step 655.

At 655, vector data received at 653 is loaded into the appropriate registers. For example, the vector data read at 653 is loaded into the vector registers designated by the load instruction. In some embodiments, register aliasing is used to determine how data is loaded into a vector register. For example, data may be loaded into the same register's memory location but aligned to byte, half-word, or word boundaries based on the instruction and aliased registers utilized. In some embodiments, the loading of vector data into vector registers utilizes a bit mask, such as a vector bit mask, to determine which bytes of a vector to load into which register memory locations. For example, a 96-bit mask may be utilized to determine which elements of a vector register should receive data.

At 657, a determination is made on whether additional data is needed. For example, based on the current vector computational unit instruction, additional data may be needed before performing an arithmetic logic unit (ALU) operation. In response to not needing additional data, processing continues to 661. As an example, processing continues to 661 in the event the current vector computational unit instruction includes an ALU component operation (such as an add operation) that is not a no-op operation. In response to needing additional data, for example, a load operation is pending and no ALU operation is pending, processing continues to 659. In some embodiments, an instruction triad may replace an ALU operation with a no-op indicating that an ALU operation should not be performed for the current instruction.

At 659, additional data is loaded into the vector computational unit for processing. For example, additional input data, such as a vector of input weights, may be loaded by reading memory, receiving the result of a matrix processor, dequeuing a first-in-first-out (FIFO) queue, or other appropriate technique. In some embodiments, additional data may be loaded by reading a memory such as a static random access memory (SRAM). In various embodiments, additional components such as a read buffer may be utilized to synchronize the loading of data and/or to account for read delays and latency. In various embodiments, the data loaded at 659 may be a vector of input data, such as a vector of weight inputs.

At 661, a vector arithmetic logic unit (ALU) operation is performed. In various embodiments, vector ALU operations include vector operations for add (signed and unsigned), subtract (signed and unsigned), multiply, absolute value, and logical operators, among others. Vector ALU operations may be performed on different operand sizes. Example operand sizes include 8-bit, 16-bit, 32-bit, and floating point values. In some embodiments, the different operand sizes are determined based on register aliasing and/or the opcode of the operation. For example, a vector add operation on 8-bit operands utilizes 8-bit vector registers. As explained in more detail with respect to FIGS. 4A and 4B, register aliasing allows the same memory location to be referenced using different aliases. For example, a 32-bit block of memory can be referenced as a single 4-byte operand, two 2-byte operands, or four 1-byte operands depending on the desired result. In various embodiments, each processing element of the vector computational unit performs the same ALU operation (e.g., add, subtract, multiply, etc.) in parallel with the other processing elements. In some embodiments, the output result is a quantized version of the ALU result. For example, the output result is a quantized version that requires fewer bits to represent than the ALU result. In some embodiments, the ALU result is calculated using a result represented using fewer bits than the input operands. For example, input operands may be 4-bytes each and an output result may be 1-byte in size.

At 663, the vector result of the arithmetic logic unit (ALU) operation performed at 661 is written out of the vector computational unit. In some embodiments, the vector result is written out utilizing an output buffer that allows processing to continue for the next ALU operation in the event the output bus is not available to receive data. In some embodiments, the vector output result is transferred to a post-processing unit such as post-processing units 115, 215, and/or 315 of FIGS. 1, 2, and 3, respectively. For example, the result of performing an ALU operation is written to a post-processing unit for performing post-processing pooling operations. In some embodiments, the output vector result is written to memory such as static random access memory (SRAM). In various embodiments, the output is written out as a vector of elements such as a 96-element vector with each element having the size of 1 byte.

Figure 7:
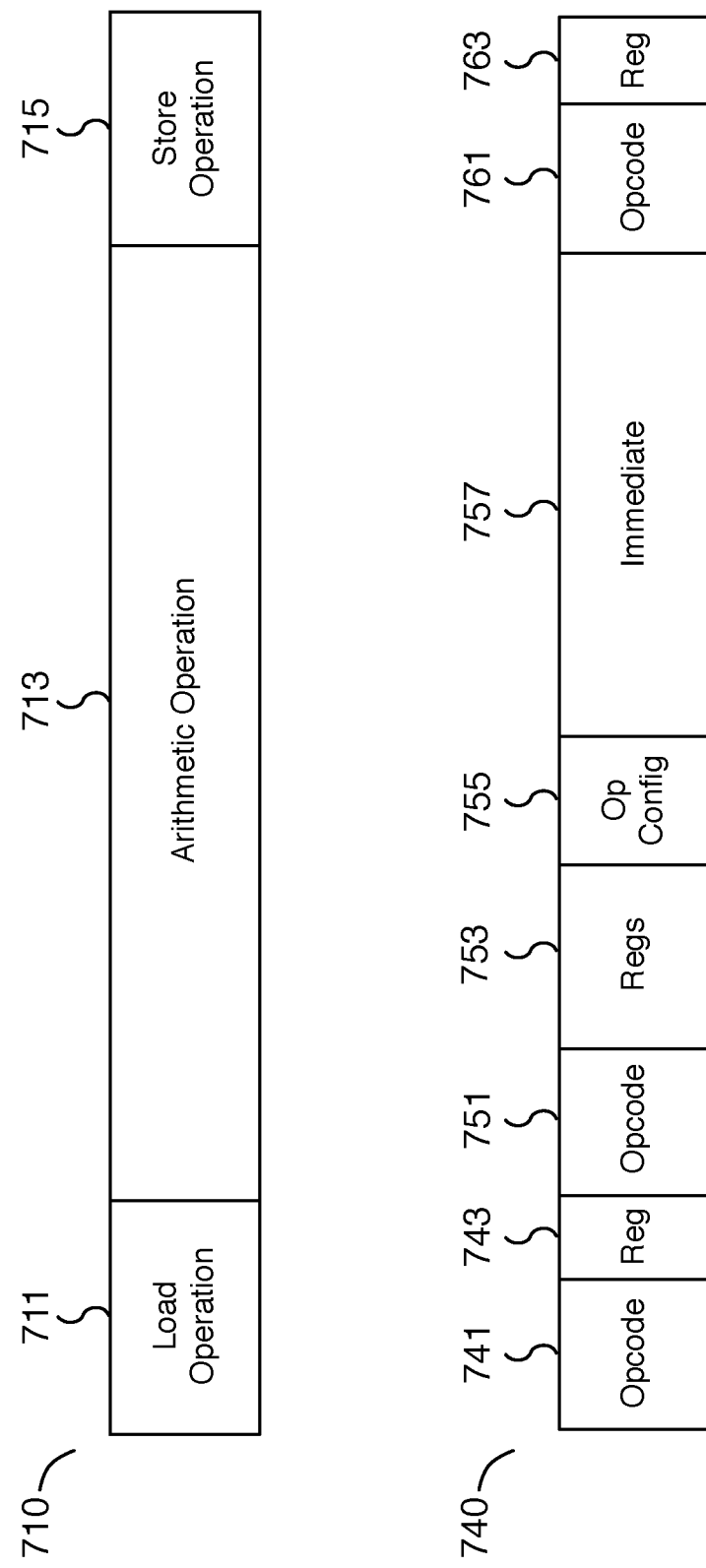
FIG. 7 is a block diagram illustrating an embodiment of an encoding format for a vector computational unit instruction.

FIG. 7 is a block diagram illustrating an embodiment of an encoding format for a vector computational unit instruction. In the example shown, vector computational unit instruction 710 depicts the encoding of multiple component instructions specified by a single instruction. Vector computational unit instruction 740 further details the format of each of the multiple component instructions specified by a single instruction. Vector computational unit instruction 710 is an encoded instruction triad and includes load operation 711, arithmetic logic unit (ALU) operation 713, and store operation 715. Vector computational unit instruction 740 includes fields: opcode 741, register 743, opcode 751, registers 753, opcode configuration field 755, immediate field 757, opcode 761, and register 763. The fields for component instructions (corresponding to a load operation, ALU operation, and store operation) depicted by vector computational unit instruction 710 map to vector computational unit instruction 740. Vector computational unit instruction 740 includes an encoded load operation (opcode 741 and register 743), arithmetic logic unit operation (opcode 751, registers 753, opcode configuration field 755, and immediate field 757), and store operation (opcode 761 and register 763).

In some embodiments, a vector computational unit instruction is an instruction triad specifying three component instructions. For example, a load operation, arithmetic logic unit (ALU) operation, and store operation may be bundled into a single instruction using a 128-bit format. In various embodiments, a larger or smaller bit format may be utilized to bundle the three component instructions as appropriate. In some embodiments, load and store operations are encoded into 13 bits and ALU operations are encoded into 64 bits. In various embodiments, any remaining bits not used by the bundled load, store, and ALU operations are padding bits. In some embodiments, opcodes are encoded into 8 bits, registers are encoded into 5 bits, and immediate fields are encoded into 32 bits. In various embodiments, different length encodings may be utilized as appropriate and are based on the instruction size, number of supported vector operations, number of registers, vector size, and/or other appropriate factors. In some scenarios, a no-op operation is used when one or more of the component instructions are not utilized.

In the example shown, the encoded load operation of vector computational unit instruction 740 includes opcode 741 and register 743. Opcode 741 corresponds to a vector load operation and register 743 is the corresponding destination vector register for the load operation. For example, opcode 741 may be used to store the opcode for a dequeue operation that loads data and register 743 is the destination register for storing the loaded data. In various embodiments, the load operation is used to load a vector of input data into a vector register for processing by a vector computational unit. In some embodiments, opcode 741 is an 8-bit field and register 743 is a 5-bit field.

In the example shown, the encoded store operation of vector computational unit instruction 740 includes opcode 761 and register 763. Opcode 761 corresponds to a vector store operation and register 763 is the corresponding source vector register for which the store operation should read a vector of data from. For example, opcode 761 may be used to store the opcode for a store operation that stores data from register 763 to external memory such as static random access memory (SRAM). In some embodiments, the start address of the memory used for storing is maintained by an external sequencer or control unit using a write pointer to reference a memory location. In some embodiments, the store operation is used to write a vector of data to an output data bus. In some embodiments, opcode 761 is an 8-bit field and register 763 is a 5-bit field.

In the example shown, the encoded arithmetic logic unit (ALU) operation includes opcode 751, registers 753, opcode configuration field 755, and immediate field 757. Opcode 751 is used to encode an ALU opcode. For example, ALU opcodes may include opcodes that correspond to vector operations for add (signed and unsigned), subtract (signed and unsigned), multiply, absolute value, and logical operators, among others. Depending on the vector ALU operation, the operation may utilize fields: registers 753, opcode configuration field 755, and immediate field 757. In some embodiments, registers 753 specifies up to four vector registers including three source registers and one destination register. In some embodiments, registers 753 is a 20-bit field and utilizes 5 bits for each register.

In some embodiments, an encoded arithmetic logic unit (ALU) operation includes opcode configuration field 755 that is utilized by certain ALU operations. In some embodiments, opcode configuration field 755 is a 5-bit field and includes a register size field (2-bits), a mask bit (1-bit), and an immediate valid bit (1-bit). For example, in some scenarios, the value stored in the register size field (2-bits) may be used to specify the size of the registers (e.g., 8-bits, 16-bits, or 32-bits). As additional examples, a mask bit (1-bit) may be utilized to process immediate field 757 as a bit mask and an immediate valid bit (1-bit) may be utilized to identify the validity of immediate field 757. In various embodiments, immediate field 757 is a 32-bit field that is utilized for ALU operations that require an immediate field. For example, a vector move operation may be configured to move a 32-bit value from immediate field 757 to a destination vector register.

In some embodiments, a vector computational unit supports a vector mask move instruction (not shown) to load a vector bit mask into a vector mask register. In some embodiments, a vector mask move instruction includes a corresponding opcode field, a destination register field, and an immediate field. As an example, the vector mask move loads a vector bit mask stored in the immediate field to the vector mask register. In some embodiments, the size of the vectors (e.g., 96 elements wide) supported by the vector computational unit requires a large enough immediate field (e.g., 96-bits) to store the bit mask. In some embodiments, the vector mask move instruction is not restricted to the encoding formats of vector computational unit instructions 710 and 740. For example, based on the size of the immediate field, the vector mask move may not be bundled with other component instructions.

In various embodiments, the component instructions of vector computational unit instructions are bundled together using the process of FIG. 5. In some embodiments, the encoding format of FIG. 7 is utilized by a vector computational unit such as vector engine 111, 211, 311, and/or vector computational unit 401 of FIGS. 1, 2, 3, and 4A, respectively. In some embodiments, a vector computational unit instruction is issued to a vector computational unit by a sequencer of a microprocessor system or control unit containing a sequencer.

Figure 8:
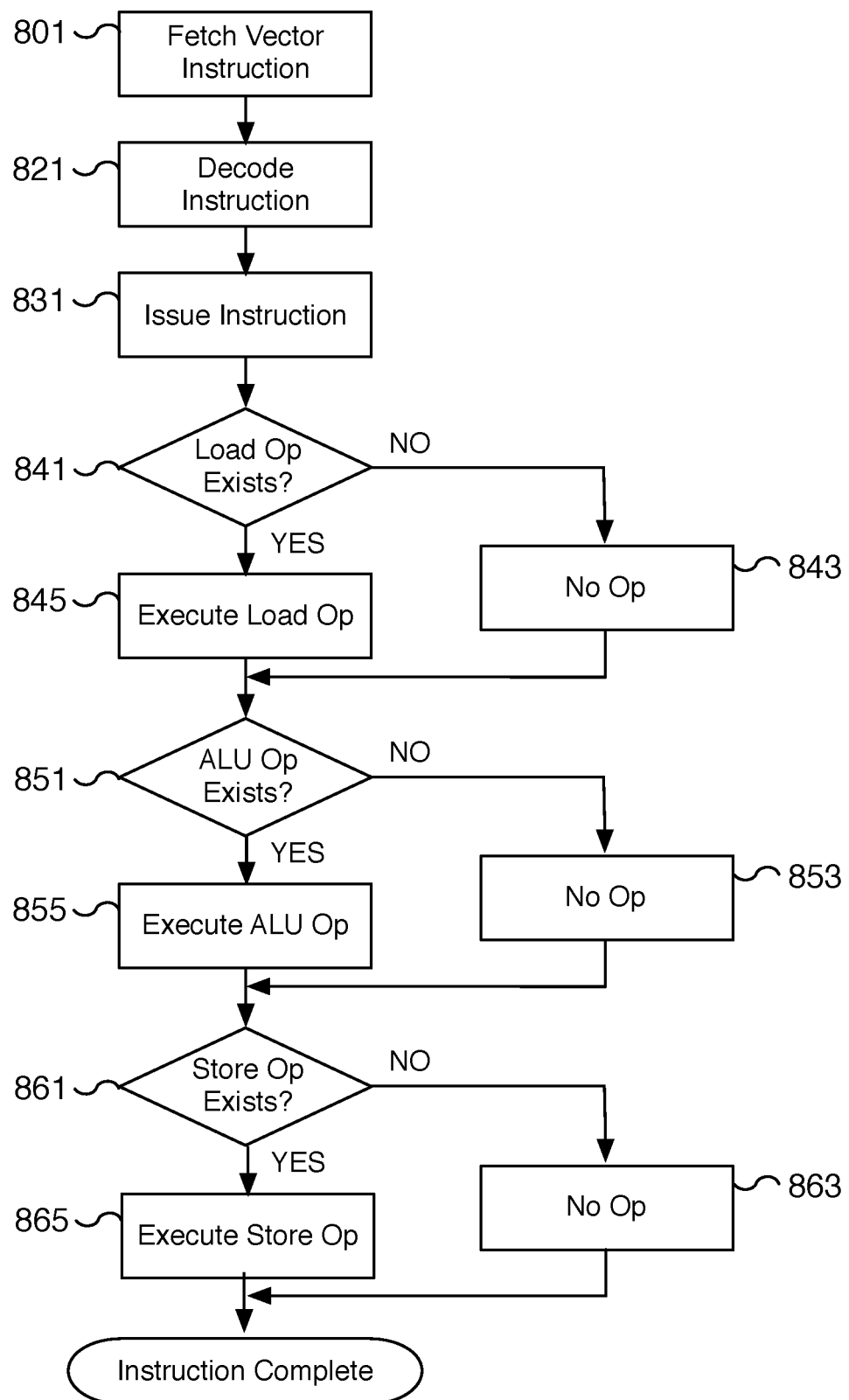
FIG. 8 is a flow diagram illustrating an embodiment of a process for performing a single vector computational unit instruction by a vector computational unit.

FIG. 8 is a flow diagram illustrating an embodiment of a process for performing a single vector computational unit instruction by a vector computational unit. The process of FIG. 8 may be performed by a vector computational unit on elements of a vector in parallel utilizing the processing elements of a vector computational unit. In some embodiments, the process of FIG. 8 is performed by a vector computational unit such as vector engine 111, 211, 311, and/or vector computational unit 401 of FIGS. 1, 2, 3, and 4A, respectively.

At 801, a vector computational unit instruction is fetched. In some embodiments, the instruction is fetched from an instruction buffer and/or command queue. In various embodiments, the instruction buffer includes one or more pointers to reference the current instruction to be performed. In various embodiments, the instruction buffer acts as a cache of vector computational unit instructions.

At 821, the vector computational unit instruction is decoded. For example, a vector computational unit instruction that is an instruction triad is decoded into its three component instructions. In various embodiments, the arguments and fields utilized by each component instruction are decoded. For example, vector registers specified by a registers field, such as registers 753 of FIG. 7, are decoded into source and destination registers.

At 831, the component instructions are issued. In some embodiments, the issuing of component instructions includes determining whether a resource and/or data hazards are present. In the event hazards are present, in some embodiments, the vector computational unit waits for the hazard to be resolved. For example, in the event of a resource hazard caused by a load operation in the previous clock cycle, the vector computational unit waits one or more clock cycles for the load to complete and for the resource to be available.

In some embodiments, the multiple component instructions are issued together and executed in parallel. For example, the load operation, arithmetic logic unit (ALU) operation, and store operation of an instruction triad are executed together and during the same clock cycle. In the scenario where the component instructions are executed together, each of the steps corresponding to executing a load operation (step 845), an ALU operation (step 855), and a store operation (step 865) along with corresponding no-op alternatives (steps 843, 854, and 863) are initiated in the same clock cycle and execution proceeds in parallel.

In some embodiments, the different component instructions are executed with staggered starts. For example, in some embodiments, the load operation is executed first, followed by the arithmetic logic unit (ALU) operation, and then the store operation. In a staggered scenario, the ALU operation of a first vector computational unit instruction may execute in parallel with the load operation of the next vector computational unit instruction.

In various embodiments, different operations, including different arithmetic logic unit (ALU) operations, take one or more clock cycles to complete and there is no guarantee that the different operations complete by the end of the same clock cycle. In some embodiments, one or more of the fetch (801), decode (step 821), and issue (step 831) steps may be performed during the same instruction cycle.

At 841, a determination is made on whether the vector computational unit instruction includes a load operation. For example, in some scenarios, a load operation may be replaced with a no-op to indicate that no load operation should be performed. In response to a no-op, processing continues to 843. In the event that a load operation exists, processing continues to 845.

At 843, a no-op is processed and no load operation is performed. For example, a load instruction was not present in the instruction at 841 and instead the opcode for a no-op was used.

At 845, a load operation is executed by the vector computational unit. For example, a dequeue operation to load an input vector from a first-in-first-out queue, such as vector engine input queue 207, is performed.

At 851, a determination is made on whether the vector computational unit instruction includes an arithmetic logic unit (ALU) operation. For example, in some scenarios, an ALU operation may be replaced with a no-op to indicate that no ALU operation should be performed. In response to a no-op, processing continues to 853. In the event that an ALU operation exists, processing continues to 855.

At 853, a no-op is processed and no arithmetic logic unit (ALU) operation is performed. For example, an ALU instruction was not present in the instruction at 851 and instead the opcode for a no-op was used.

At 855, an arithmetic logic unit (ALU) operation is executed by the vector computational unit. For example, in response to a vector add operation, the arithmetic logic unit of a vector computational unit performs a vector add operation to add the contents of two source vector registers and store the result in a destination vector register. In some embodiments, the arithmetic logic unit of the vector computational unit is arithmetic logic units (ALUs) 427 of FIG. 4A.

At 861, a determination is made on whether the vector computational unit instruction includes a store operation. For example, in some scenarios, a store operation may be replaced with a no-op to indicate that no store operation should be performed. In response to a no-op, processing continues to 863. In the event that a store operation exists, processing continues to 865.

At 863, a no-op is processed and no store operation is performed. For example, a store instruction was not present in the instruction at 861 and instead the opcode for a no-op was used.

At 865, a store operation is executed by the vector computational unit. For example a store operation to store the vector data in a vector register to memory is performed.

Figure 9:
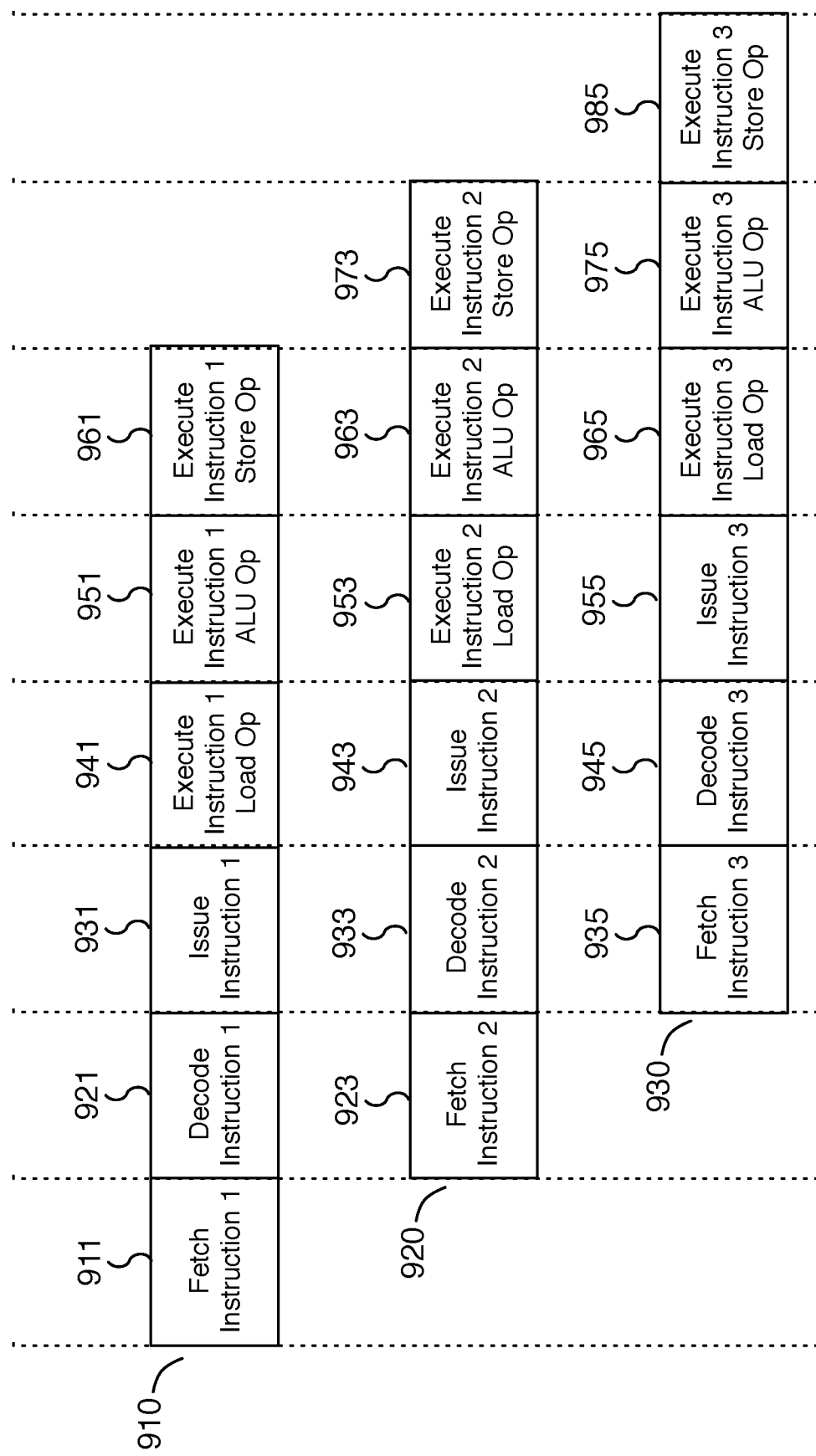
FIG. 9 is a diagram illustrating an exemplary instruction cycle of a vector computational unit.

FIG. 9 is a diagram illustrating an exemplary instruction cycle of a vector computational unit. The process of FIG. 9 illustrates an example ordering and sequence of three vector computational unit instructions performed in parallel but with staggered starts. In some embodiments, the exemplary instruction cycle of FIG. 9 is utilized by vector engine 111, 211, 311, and/or vector computational unit 401 of FIGS. 1, 2, 3, and 4A, respectively. In the example of FIG. 9, the component instructions bundled as a single instruction are executed with staggered starts such that a load operation is executed first, followed by an arithmetic logic unit (ALU) operation, and then a store operation. In some embodiments, sequential vector computational unit instructions are pipelined but the component instructions are executed in parallel and do not follow the staggered starts depicted in FIG. 9.

In the example shown, a first instruction cycle 910 includes fetch step 911, a decode step 921, an issue step 931, a load execution step 941, an arithmetic logic unit (ALU) execution step 951, and a store execution step 961 corresponding to the first vector computational unit instruction. A second instruction cycle 920 includes fetch step 923, a decode step 933, an issue step 943, a load execution step 953, an arithmetic logic unit (ALU) execution step 963, and a store execution step 973 corresponding to the second vector computational unit instruction. A third instruction cycle 930 includes fetch step 935, a decode step 945, an issue step 955, a load execution step 965, an arithmetic logic unit (ALU) execution step 975, and a store execution step 985 corresponding to the third vector computational unit instruction. In some embodiments, the dotted vertical lines are clock cycle boundaries. In various embodiments, the steps within the same clock cycle boundaries are started during the same clock cycle.

In some embodiments, the start of instruction cycles are staggered by one stage. For example, first instruction cycle 910 is one stage ahead in processing compared to second instruction cycle 920, and two stages ahead of third instruction cycle 930. During any given clock cycle, different vector computational unit instructions can be utilizing the hardware resources associated with the different stages: fetch, decode, issue, load execution, arithmetic logic unit (ALU) execution, and store execution. As an example, issue stage 931, decode stage 933, and fetch stage 935 of first, second, and third instruction cycles 910, 920, and 930, respectively, execute during the same clock cycle. As another example, store execution step 961, arithmetic logic unit (ALU) execution step 963, and load execution step 965 of first, second, and third instruction cycles 910, 920, and 930, respectively, execute during the same clock cycle.

In some embodiments, the instruction cycle of a vector computational unit achieves a throughput of one vector computational unit instruction per clock cycle. In some embodiments, the fetch, decode, and/or issue steps are compressed into a single clock cycle. For example, in some embodiments, an instruction buffer is utilized to minimize fetch times and a fetch and decode step are performed together. In some embodiments, each stage of the instruction cycle may take one or more clock cycles to complete. In some embodiments, the stages are themselves pipelined. For example, in the event an execution step takes more than one cycle to complete, an execution step may be pipelined to complete over multiple clock cycles. In some embodiments, multiple execution steps may be processed in parallel in a pipelined manner and each execution step may correspond to a different vector computational unit instruction. In some embodiments, fetch steps 911, 923, and 935 correspond to step 801 of FIG. 8, decode steps 921, 933, and 945 correspond to step 821 of FIG. 8, issue steps 931, 943, and 955 correspond to step 831 of FIG. 8, load execution steps 941, 953 and 965 correspond to step 845 of FIG. 8, arithmetic logic unit (ALU) execution steps 951, 963, and 975 correspond to step 855 of FIG. 8, and store execution steps 961, 973, and 985 correspond to step 865 of FIG. 8.

In an alternative embodiment (not shown), the fetch, decode, and issues stages of an instruction cycle are performed in the same order as FIG. 9. In contrast with the exemplary embodiment of FIG. 9, the load, arithmetic logic unit (ALU), and store execution steps are executed together and in parallel during the same clock cycle. For example, load execution step 941, ALU execution step 951, and store execution step 961 of the same vector computational unit instruction are executed together.

Figure 10:
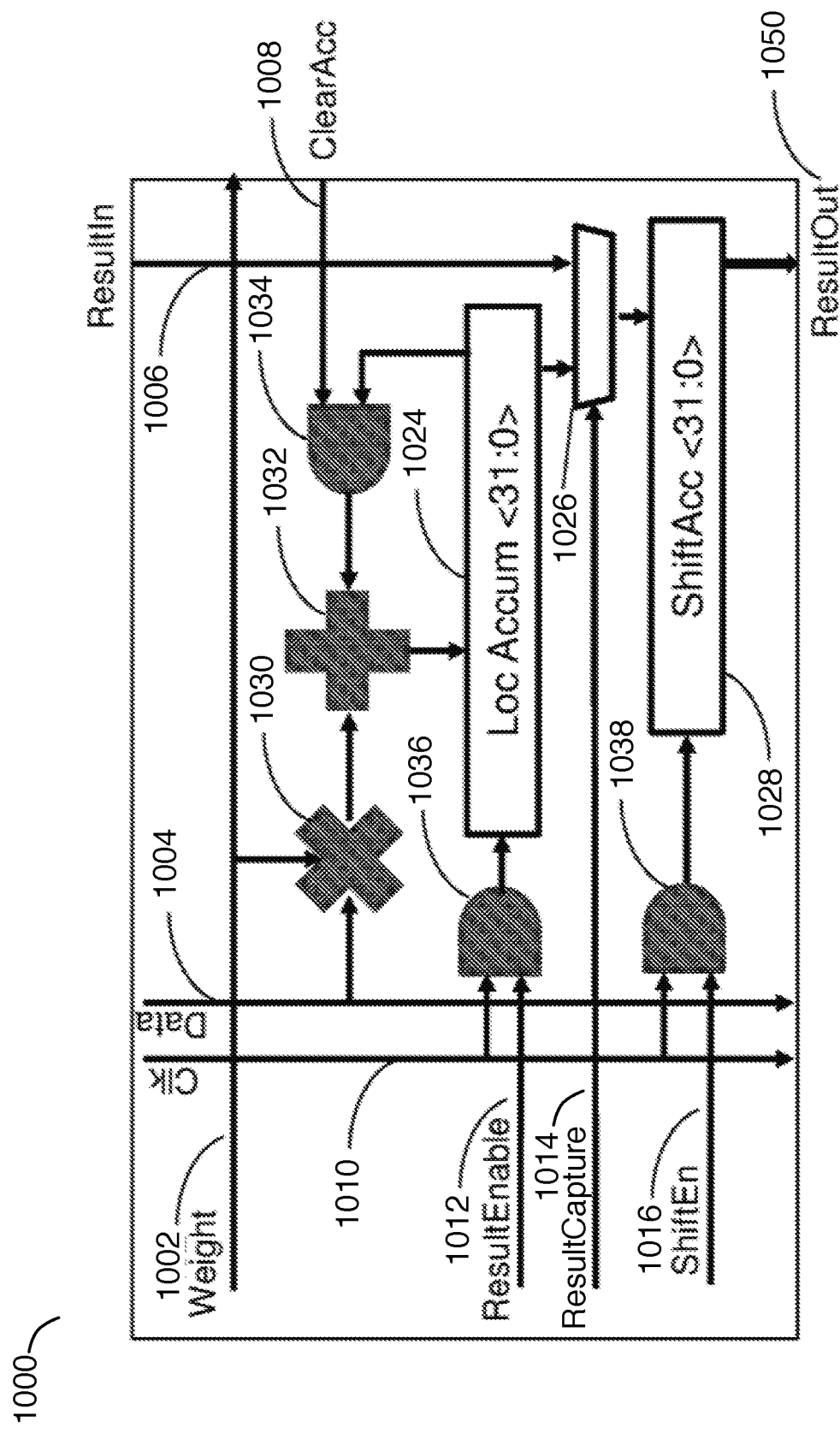
FIG. 10 is a block diagram illustrating an embodiment of a computation unit of a computational array.

FIG. 10 is a block diagram illustrating an embodiment of a computation unit of a computational array. In the example shown, computation unit 1000 includes input values weight 1002, data 1004, and ResultIn 1006; signals ClearAcc signal 1008, Clock signal 1010, ResultEnable signal 1012, ResultCapture signal 1014, and ShiftEn signal 1016; components accumulator 1024, multiplexer 1026, shadow register 1028, multiplier 1030, and adder 1032; logic 1034, 1036, and 1038; and output value ResultOut 1050. In some embodiments, logic 1034, 1036, and 1038 are AND gates. In some embodiments, additional signals are included as appropriate. In various embodiments, the computation unit of FIG. 10 is repeated for each of the plurality of computation units, such as computation unit 109, of a computation array such as matrix processor 107 of FIG. 1. Computation unit 1000 may be utilized to implement computational operations in parallel. In various embodiments, each computation unit of a computational array performs computations in parallel with the other computation units. In various embodiments, computation unit 1000 is a sub-circuit of a matrix processor that includes the functionality for performing one or more multiply, add, accumulate, and/or shift operations. For example, computation unit 1000 may be a sub-circuit that includes the functionality for performing a dot-product operation. In various embodiments, computation unit 1000 is computation unit 109 of FIG. 1 and/or computation units 209, and/or 221-229 of FIG. 2.

In some embodiments, Clock signal 1010 is a clock signal received by computation unit 1000. In various embodiments, each computation unit of the computational array receives the same clock signal and the clock signal is utilized to synchronize the processing of each computation unit with the other computation units.

In the example shown, multiplier 1030 receives and performs a multiplication operation on the input values data 1004 and weight 1002. The output of multiplier 1030 is fed to adder 1032. Adder 1032 receives and performs an addition on the output of multiplier 1030 and the output of logic 1034. The output of adder 1032 is fed to accumulator 1024. In some embodiments, input values data 1004 and weight 1002 are lines that cross computation units and feed the corresponding data and/or weight to neighboring computation units. For example, in some embodiments, data 1004 is fed to all computation units in the same column and weight 1002 is fed to all computation units in the same row. In various embodiments, data 1004 and weight 1002 correspond to input elements fed to computation unit 1000 from a data input 103 and a weight input 105, respectively. In various embodiments, data 1004 and weight 1002 correspond to input elements fed to computation unit 1000 from a data hardware data formatter and a weight hardware data formatter, respectively.

In some embodiments, ClearAcc signal 1008 clears the contents of accumulator 1024. As an example, accumulation operations can be reset by clearing accumulator 1024 and used to accumulate the result of multiplier 1030. In some embodiments, ClearAcc signal 1008 is used to clear accumulator 1024 for performing a new dot-product operation. For example, elements-wise multiplications are performed by multiplier 1030 and the partial-dot-product results are added using adder 1032 and accumulator 1024.

In various embodiments, accumulator 1024 is an accumulator capable of accumulating the result of adder 1032 and indirectly the result of multiplier 1030. For example, in some embodiments, accumulator 1024 is configured to accumulate the result of multiplier 1030 with the contents of accumulator 1024 based on the status of ClearAcc signal 1008. As another example, based on the status of ClearAcc signal 1008, the current result stored in accumulator 1024 may be ignored by adder 1032. In the example shown, accumulator 1024 is a 32-bit wide accumulator. In various embodiments, accumulator 1024 may be sized differently, e.g., 8-bits, 16-bits, 64-bits, etc., as appropriate. In various embodiments, each accumulator of the plurality of computation units of a computational array is the same size. In various embodiments, accumulator 1024 may accumulate and save data, accumulate and clear data, or just clear data.

In some embodiments, accumulator 1024 may be implemented as an accumulation register. In some embodiments, accumulator 1024 may include a set of arithmetic logic units (ALUs) that include registers.

In some embodiments, ResultEnable signal 1012 is activated in response to a determination that data 1004 is valid. For example, ResultEnable signal 1012 may be enabled to enable processing by a computation unit such as processing by multiplier 1030 and adder 1032 into accumulator 1024.

In some embodiments, ResultCapture signal 1014 is utilized to determine the functionality of multiplexer 1026. Multiplexer 1026 receives as input ResultIn 1006, output of accumulator 1024, and ResultCapture signal 1014. In various embodiments, ResultCapture signal 1014 is used to enable either ResultIn 1006 or the output of accumulator 1024 to pass through as the output of multiplexer 1026. In some embodiments, multiplexer 1026 is implemented as an output register. In some embodiments, ResultIn 1006 is connected to a computation unit in the same column as computation unit 1000. For example, the output of a neighboring computation unit is fed in as an input value ResultIn 1006 to computation unit 1000. In some embodiments, the input of a neighboring computation unit is the computation unit's corresponding ResultOut value.

In some embodiments, shadow register 1028 receives as input the output of multiplexer 1026. In some embodiments, shadow register 1028 is configured to receive the output of accumulator 1024 via multiplexer 1026 depending on the value of ResultCapture signal 1014. In the example shown, the output of shadow register 1028 is output value ResultOut 1050. In various embodiments, once a result is inserted into shadow register 1028, accumulator 1024 may be used to commence new calculations. For example, once the final dot-product result is stored in shadow register 1028, accumulator 1024 may be cleared and used to accumulate and store the partial result and eventually the final result of a new dot-product operation on new weight and data input values. In the example shown, shadow register 1028 receives a signal ShiftEn signal 1016. In various embodiments, ShiftEn signal 1016 is used to enable or disable the storing of values in the shadow register 1028. In some embodiments, ShiftEn signal 1016 is used to shift the value stored in shadow register 1028 to output value ResultOut 1050. For example, when ShiftEn signal 1016 is enabled, the value stored in shadow register 1028 is shifted out of shadow register 1028 as output value ResultOut 1050. In some embodiments, ResultOut 1050 is connected to a neighboring computation unit's input value ResultIn. In some embodiments, the last cell of a column of computation units is connected to the output of the computational array. In various embodiments, the output of the computational array feeds into a vector engine such as vector engine 111 of FIG. 1 for vector processing. For example, the output ResultOut 1050 of a computation cell such as computation cell 109 of FIG. 1 may be fed into a processing element of a vector engine such as processing element 113 of vector engine 111 of FIG. 1.

In the example shown, shadow register 1028 is 32-bits wide. In various embodiments, shadow register 1028 may be sized differently, e.g., 8-bits, 16-bits, 64-bits, etc., as appropriate. In various embodiments, each shadow register of the plurality of computation units of a computational array is the same size. In various embodiments, shadow register 1028 is the same size as accumulator 1024. In various embodiments, the size of multiplexer 1026 is based on the size of accumulator 1024 and/or shadow register 1028 (e.g., the same size or larger).

In some embodiments, logic 1034, 1036, and 1038 receive signals, such as control signals, to enable and/or configure the functionality of computation unit 1000. In various embodiments, logic 1034, 1036, and 1038 are implemented using AND gates and/or functionality corresponding to an AND gate. For example, as described above, logic 1034 receives ClearAcc signal 1008 and an input value corresponding to the value stored in accumulator 1024. Based on ClearAcc signal 1008, the output of logic 1034 is determined and fed to adder 1032. As another example, logic 1036 receives ResultEnable signal 1012 and Clock signal 1010. Based on ResultEnable signal 1012, the output of logic 1036 is determined and fed to accumulator 1024. As another example, logic 1038 receives ShiftEn signal 1016 and Clock signal 1010. Based on ShiftEn signal 1016, the output of logic 1038 is determined and fed to shadow register 1028.

In various embodiments, computation units may perform a multiplication, an addition operation, and a shift operation at the same time, i.e., within a single cycle, thereby doubling the total number of operations that occur each cycle. In some embodiments, results are moved from multiplexer 1026 to shadow register 1028 in a single clock cycle, i.e., without the need of intermediate execute and save operations. In various embodiments, the clock cycle is based on the signal received at Clock signal 1010.

In various embodiments, input values weight 1002 and data 1004 are 8-bit values. In some embodiments, weight 1002 is a signed value and data 1004 is unsigned. In various embodiments, weight 1002 and data 1004 may be signed or unsigned, as appropriate. In some embodiments, ResultIn 1006 and ResultOut 1050 are 32-bit values. In various embodiments ResultIn 1006 and ResultOut 1050 are implemented using a larger number of bits than input operands weight 1002 and data 1004. By utilizing a large number of bits, the results of multiplying multiple pairs of weight 1002 and data 1004, for example, to calculate a dot-product result, may be accumulated without overflowing the scalar result.

In some embodiments, computation unit 1000 generates an intermediate and/or final computation result in accumulator 1024. The final computation result is then stored in shadow register 1028 via multiplexer 1026. In some embodiments, multiplexer 1026 functions as an output register and store the output of accumulator 1024. In various embodiments, the final computation result is the result of a convolution operation. For example, the final result at ResultOut 1050 is the result of convolution between a filter received by computation unit 1000 as input values using weight 1002 and a two-dimensional region of sensor data received by computation unit 1000 as input values using data 1004.

As an example, a convolution operation may be performed using computation unit 1000 on a 2×2 data input matrix [d0 d1; d2 d3] corresponding to a region of sensor data and a filter corresponding to a 2×2 matrix of weights [w0 w1; w2 w3]. The 2×2 data input matrix has a first row [d0 d1] and a second row [d2 d3]. The filter matrix has a first row [w0 w1] and a second row [w2 w3]. In various embodiments, computation unit 1000 receives the data matrix via data 1004 as a one-dimensional input vector [d0 d1 d2 d3] one element per clock cycle and weight matrix via weight 1002 as a one-dimensional input vector [w0 w1 w2 w3] one element per clock cycle. Using computation unit 1000, the dot product of the two input vectors is performed to produce a scalar result at ResultOut 1050. For example, multiplier 1030 is used to multiply each corresponding element of the input weight and data vectors and the results are stored and added to previous results in accumulator 1024. For example, the result of element d0 multiplied by element w0 (e.g., d0*w0) is first stored in cleared accumulator 1024. Next, element d1 is multiplied by element w1 and added using adder 1032 to the previous result stored in accumulator 1024 (e.g., d0*w0) to compute the equivalent of d0*w0+d1*w1. Processing continues to the third pair of elements d2 and w2 to compute the equivalent of d0*w0+d1*w1+d2*w2 at accumulator 1024. The last pair of elements is multiplied and the final result of the dot product is now stored in accumulator 1024 (e.g., d0*w0+d1*w1+d2*w2+d3*w3). The dot-product result is then copied to shadow register 1028. Once stored in shadow register 1028, a new dot-product operation may be initiated, for example, using a different region of sensor data. Based on ShiftEn signal 1016, the dot-product result stored in shadow register 1028 is shifted out of shadow register 1028 to ResultOut 1050. In various embodiments, the weight and data matrices may be different dimensions than the example above. For example, larger dimensions may be used.

In some embodiments, a bias parameter is introduced and added to the dot-product result using accumulator 1024. In some embodiments, the bias parameter is received as input at either weight 1002 or data 1004 along with a multiplication identity element as the other input value. The bias parameter is multiplied against the identity element to preserve the bias parameter and the multiplication result (e.g., the bias parameter) is added to the dot-product result using adder 1032. The addition result, a dot-product result offset by a bias value, is stored in accumulator 1024 and later shifted out at ResultOut 1050 using shadow register 1028. In some embodiments, a bias is introduced using a vector engine such as vector engine 111 of FIG. 1.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A microprocessor system, comprising:
a vector computational unit that includes a plurality of processing elements, wherein each processing element is connected to a corresponding computation unit in a last row of a plurality of computation units included in a computational array, wherein each processing element comprises an arithmetic logic unit (ALU),
wherein the computation units are grouped into a plurality of lanes comprising a plurality of first-in-first-out (FIFO) queues, wherein each lane comprises a subset of the computation units arranged in a column which form an individual FIFO queue of the plurality of FIFO queues, wherein at least a subset of the plurality of computation units is configured to receive a row of data elements from a vector input module in parallel,
wherein the FIFO queues operate in parallel and shift the row of data elements through the FIFO queues to the vector computational unit, such that the row of data elements is shifted in parallel through the FIFO queues and each data element of the row of data elements is provided in parallel from the last row of the computation units to the corresponding processing elements; and
a control unit circuit configured to provide at least a single processor instruction to the vector computational unit, the control unit circuit being configured to synchronize receipt of the data elements from the plurality of lanes to respective processing elements,
wherein the single processor instruction specifies at least three different component instructions to be executed by the vector computational unit in response to the single processor instruction and each of the plurality of processing elements of the vector computational unit is configured to process the received data elements in parallel with other processing elements in response to the single processor instruction,
wherein the at least three different component instructions utilize different hardware resources of each of the processing elements included in the vector computational unit, the hardware resources of each of the processing elements comprising, at least, the ALU,
wherein for a particular clock cycle, the processing elements are configured to execute different component instructions of different single processor instructions,
wherein the different single processor instructions are executed using staggered starts by the vector computational unit,
wherein a first component instruction is specified by a first processor instruction, a second component instruction is specified by a second processor instruction, and a third component instruction is specified by a third processor instruction,
and wherein the first component instruction, second component instruction, and third component instruction, utilize different hardware resources of the vector computational unit during the particular clock cycle.

2. The system of claim 1, wherein the at least three different component instructions include an encoded memory access operation component instruction and an encoded arithmetic logic unit operation component instruction.

3. The system of claim 2, wherein the encoded memory access operation component instruction is an encoded load operation component instruction or an encoded store operation component instruction.

4. The system of claim 1, wherein the at least three different component instructions include an encoded load operation component instruction, an encoded arithmetic logic unit operation component instruction, and an encoded store operation component instruction.

5. The system of claim 4, wherein for the particular clock cycle of the vector computational unit, a load operation associated with the first processor instruction, an arithmetic logic unit operation associated with the second processor instruction, and a store operation associated with the third processor instruction, are executed in parallel.

6. The system of claim 1, wherein a load operation, an arithmetic logic unit operation, and a store operation correspond to the different component instructions of the different single processor instructions.

7. The system of claim 1, wherein the vector computational unit is configured to process an execute stage for each of the at least three different component instructions in parallel.

8. The system of claim 1, wherein the vector computational unit includes a plurality of vector registers, a control logic, an input buffer, and an output buffer.

9. The system of claim 1, wherein one of the at least three different component instructions references one or more vector registers of the vector computational unit.

10. The system of claim 1, wherein the vector computational unit includes one or more aliased vector registers.

11. The system of claim 10, wherein the one or more aliased vector registers include an aliased 8-bit vector register, an aliased 16-bit vector register, or an aliased 32-bit vector register.

12. The system of claim 1, wherein one of the at least three different component instructions references three source registers and one destination register.

13. The system of claim 1, wherein the first processor instruction encodes a vector mask move instruction.

14. The system of claim 1, wherein one of the at least three different component instructions includes a vector bit mask, a register size field, a mask bit, or an immediate valid bit.

15. The system of claim 1, wherein based on the last row of the computation units being configured to dequeue the row of data elements, a dequeue ready signal is received by the vector computational unit to indicate that the computational array is configured to receive a queue operation.

16. A method comprising:
receiving a plurality of processor instructions from a control unit circuit, the plurality of processor instructions comprising a first processor instruction, a second processor instruction, and a third processor instruction, wherein the processor instructions specify a plurality of component instructions;
decoding the processor instructions into the plurality of component instructions;
using a vector computational unit that includes a plurality of processing elements to execute the plurality of component instructions, the processing elements being connected to a corresponding computation unit of a plurality of computation units included in a computational array, wherein each processing element comprises an arithmetic logic unit (ALU),
wherein the computation units are grouped into a plurality of lanes comprising a plurality of first-in-first-out (FIFO) queues, wherein each lane comprises a subset of the computation units arranged in a column which form an individual FIFO queue of the plurality of FIFO queues, wherein at least a subset of the plurality of computation units is configured to receive a row of data elements from a vector input module in parallel,
wherein the FIFO queues operate in parallel and shift the row of data elements through the FIFO queues to the vector computational unit, such that the row of data elements is shifted in parallel through the FIFO queues and each data element of the row of data elements is provided in parallel from a last row of the computation units to the corresponding processing elements; and
using each of the plurality of processing elements to process respective received data elements in parallel with other processing elements,
wherein the control unit circuit is configured to synchronize receipt of the data elements from the plurality of lanes to respective processing elements
wherein for a particular clock cycle, the processing elements are configured to execute different component instructions of the plurality of processor instructions, wherein the plurality of processor instructions are executed using staggered starts,
wherein a first of the different component instructions is specified by the first processor instruction, a second of the different component instructions is specified by the second processor instruction, and a third of the different component instructions is specified by the third processor instruction,
and wherein the first of the different component instructions, the second of the different component instructions, and the third of the different component instructions, utilize different hardware resources of the vector computational unit during the particular clock cycle.

* * * * *